(12) United States Patent
Cohen-Or et al.

(10) Patent No.: US 12,711,959 B2
(45) Date of Patent: Aug. 18, 2026

(54) SYSTEMS AND METHODS FOR IMPROVED LIP DUBBING

(71) Applicant: MONSTERS ALIENS ROBOTS ZOMBIES INC., Toronto (CA)

(72) Inventors: Daniel Cohen-Or, Hod Hasharon (IL); Ali Mahdavi-Amiri, North Vancouver (CA); Matthew Panousis, Toronto (CA); Jonathan Bronfman, Toronto (CA); Lon Molnar, North Bay (CA); Thomas Davies, Toronto (CA); Ahmed Moustafa Abdelhafez Hashem, Toronto (CA)

(73) Assignee: MONSTERS ALIENS ROBOTS ZOMBIES INC., Toronto (CA)

( * ) Notice: Subject to any disclaimer, the term of this patent is extended or adjusted under 35 U.S.C. 154(b) by 0 days.

(21) Appl. No.: 18/730,575

(22) PCT Filed: Jan. 20, 2023

(86) PCT No.: PCT/CA2023/050068
§ 371 (c)(1),
(2) Date: Jul. 19, 2024

(87) PCT Pub. No.: WO2023/137557
PCT Pub. Date: Jul. 27, 2023

(65) Prior Publication Data

US 2025/0140257 A1 May 1, 2025

Related U.S. Application Data

(60) Provisional application No. 63/426,283, filed on Nov. 17, 2022, provisional application No. 63/301,947, filed on Jan. 21, 2022.

(51) Int. Cl.
*G10L 15/25* (2013.01)
*G10L 15/02* (2006.01)
(Continued)

(52) U.S. Cl.
CPC .............. *G10L 15/25* (2013.01); *G10L 15/02* (2013.01); *G10L 15/06* (2013.01); *G10L 25/18* (2013.01); *G10L 25/51* (2013.01)

(58) Field of Classification Search
CPC ......... G10L 15/25; G10L 15/02; G10L 15/06; G10L 25/18; G10L 25/51
(Continued)

(56) References Cited

U.S. PATENT DOCUMENTS 6,250,928 B1 * 6/2001 Poggio .................. G09B 19/04 434/167
6,697,120 B1 * 2/2004 Haisma .................. G06T 9/001 348/553

(Continued)

FOREIGN PATENT DOCUMENTS

KR 102251781 B1 5/2021

OTHER PUBLICATIONS

Vougioukas et al. ("End-to-End Speech-Driven Facial Animation with Temporal GANs") (Year: 2018).*

(Continued)

*Primary Examiner* — Paras D Shah
*Assistant Examiner* — Fouzia Hye Solaiman
(74) *Attorney, Agent, or Firm* — Norton Rose Fulbright Canada LLP

(57) ABSTRACT

A computer implemented system is described in various embodiments herein, the system includes a processor, a memory coupled to the processor and storing processor-executable instructions that, when executed, configure the processor to: receive an initial video data object V comprising a plurality of image frame data objects I; receive a set of time-synchronized viseme parameters corresponding to target audio data object A'; and process the initial video data object V and the set of time-synchronized viseme parameters
(Continued)

using a machine learning network to generate an output video data object V', wherein initial mouth regions in the initial video data object V have been replaced with replacement mouth regions generated based on the set of time-synchronized viseme parameters.

19 Claims, 23 Drawing Sheets

(51) Int. Cl.
*G10L 15/06* (2013.01)
*G10L 25/18* (2013.01)
*G10L 25/51* (2013.01)

(58) Field of Classification Search
USPC .......................................................... 704/232
See application file for complete search history.

(56) References Cited

U.S. PATENT DOCUMENTS

| | | | | |
|---|---|---|---|---|
| 10,770,092 | B1 * | 9/2020 | Adams | G10L 21/18 |
| 2005/0057570 | A1 * | 3/2005 | Cosatto | G06T 13/40<br>704/E21.02 |
| 2007/0192910 | A1 * | 8/2007 | Vu | H04N 7/142<br>901/1 |
| 2015/0127352 | A1 * | 5/2015 | Norsworthy | G10L 25/75<br>704/270 |
| 2017/0256262 | A1 * | 9/2017 | Ramachandra | G10L 15/14 |
| 2022/0207262 | A1 * | 6/2022 | Jeong | G06V 40/171 |
| 2023/0326112 | A1 * | 10/2023 | Saragih | G06T 11/001<br>345/426 |

OTHER PUBLICATIONS

Bregler, C. et al., Video Rewrite: Driving Visual Speech with Audio, Aug. 3, 1997, pp. 353-360, IGGRAPH '97: Proceedings of the 24th annual conference on Computer graphics and interactive techniques.

PCT-CIPO, International Search Report and Written Opinion issued to PCT/CA2023/050068, Apr. 3, 2023.

China National Intellectual Property Administration (CNIPA), First Office Action issued to CN 202380027801.4, Oct. 18, 2025.

Christoph Bregler, et al, Video Rewrite: Driving Visual Speech with Audio, SIGGRAPH'97: Proceedings of the 24th annual conference on Computer graphics and interactive techniques, pp. 353-360, Mar. 8, 1997, European Patent Office, Extended European Search Report to EP 23742653.1, Nov. 24, 2025.

Yu Lingyun et al: "Mining Audio, Text and Visual Information for Talking Face Generation", 2019 IEEE International Conference on Data Mining (ICDM), IEEE, Nov. 8, 2019 (Nov. 8, 2019), pp. 787-795, XP033700503.

Shunyu Yao et al: "DFA-NeRF: Personalized Talking Head Generation via Disentangled Face Attributes Neural Rendering", Arxiv. Org, Cornell University Library, 201 Olin Library Cornell University Ithaca, NY 14853, Jan. 3, 2022 (Jan. 3, 2022), XP091130682.

Linsen Song et al: "Everybody's Talkin': Let Me Talk as You Want", Arxiv.Org, Cornell University Library, 201 Olin Library Cornell University Ithaca, NY 14853, Jan. 15, 2020 (Jan. 15, 2020), XP081579114.

Yi Yang et al: "Large-scale multilingual 1-15 audio visual dubbing", Arxiv.Org, Cornell University Library, 201 Olin Library Cornell University Ithaca, NY 14853, Nov. 6, 2020 (Nov. 6, 2020), XP081797992.

* cited by examiner

1800A

Data and Pre-Processing

Voice2Lip Data Sources

YouTube Data

Partnership Data

Internal Recordings

Lip2Face Data Sources

YouTube Data

Partnership Data

Lip Extraction (Pylips)

Dataset Ceation (LipPuppet)

Dataset Creation (Lip2Face)

Train

Train LipPuppet

Global Model

FIG. 18B

Train Lip2Face

Global Model

SYSTEMS AND METHODS FOR IMPROVED LIP DUBBING

CROSS-REFERENCE TO RELATED APPLICATIONS

This application claims the benefit of and priority to U.S. Provisional Patent Application No. 63/301,947, filed 21 Jan. 2022, and U.S. Provisional Patent Application No. 63/426,283, filed 17 Nov. 2022, both of which are incorporated herein by reference in entirety.

FIELD

Embodiments of the present disclosure generally relate to the field of machine learning for visual effects, and more specifically, embodiments relate to systems and methods for improved manipulation of lip movements in video or images, for example, to match dubbed video footage in a target language.

INTRODUCTION

The quantity of content available on TV is rapidly expanding. Foreign movies are becoming more popular in English-speaking countries, and international streaming platforms have facilitated access to English content for non-English speakers.

To better engage audiences that speak in a language different from that of the movie in question, it is desirable to translate the movie's script and then perform dubbing. However, audio dubbing alone does not match the lip movements of speakers and may result in inconsistent timing. Therefore it is useful to manipulate the lip movements to match the dubbed movie in any given language. However, manual manipulation is not practically feasible given the immense effort required on a per-frame basis.

SUMMARY

As a result, there is a clear and growing need for automated systems and methods that given video V in language L and audio A, may manipulate V to obtain video V' based on audio A' in language L' so that the lips in video V' match audio A'. However, this presents a challenging technical problem, because video is often in a high quality and high resolution, such as 4K or greater, and a subtle mismatch or slight noise can make noticeable artifacts that should ideally be corrected and removed.

A computer implemented approach is described in various embodiments herein, where a specially configured machine learning model architecture is trained and deployed for use in receiving inputs data objects V (data representation of original video consisting of original video frame objects I), A (data representation of original audio). In some embodiments, data object A' is provided (data representation of target audio), while in other embodiments, it is generated (e.g., a machine translation step may occur to generate A').

The machine learning model architecture can include a generator network, which could include, but is not limited to, a generative adversarial network such as StyleGAN, trained as a generator to track relevant image features and to recompose them in a "hallucinated" or machine generated output image or image portion, based on a set of input hyper-parameters. The machine learning model architecture in the proposed approach generates generated image frame data objects I', and I' can either be entire images, or image portions relating specifically to mouth regions of an on-screen character (e.g., human or animated character).

The parameters provided to the machine learning model architecture for generation of I' are modified relative to I, such that a new parametric definition for a new viseme at a corresponding timestamp is utilized to generate I'. Accordingly, the machine learning model architecture is trained to computationally "redraw" the mouth region of the character based on a new target set of time-stamped visemes that can be extracted from A'. The generated image frame data objects I' are then used in whole or in part to replace portions or all of image frame data objects I in re-composing or generating output video data object V'.

A viseme can represent a group of several speech sounds that look the same, for example, when lip reading. In video processing, a viseme may include data representing a position of each of one or more regions (or a pixel thereof) within a face (e.g., mouth region and surrounding regions) when saying a group of several speech sounds that look the same. For example, in English, the words "pet" and "bet" are acoustically different. However, when observed visually (without sound), the visual appearance of a person's mouth region saying the two words would look the same.

This approach can be useful, for example, in computationally automating previously manual lip dubbing/redrawing exercises, and overcome issues relating to prior approaches are lip dubbing, where the replacement voice actors/actresses in the target language either had to match syllables with the original lip movements (resulting in awkward timing or scripts in the target language), or have on screen lip movements that do not correspond properly with the audio in the target language (the mouth moves but there is no speech, or there is no movement but the character is speaking).

A further embodiment includes using the system for post-processing of animations, where instead of having initial faces or mouths drawn in the original video, the output video is generated directly based on a set of time-synchronized visemes and the mouth or face regions, for example, are directly drawn in as part of a rendering step. This reduces the effort required for preparing the initial video for input.

In yet another further embodiment, the viseme data is provided into a machine learning architecture including a machine learning network (e.g., a generative network) that generates video absent an original input video, and an entirely "hallucinated" video based on a set of instruction or storyboard data objects is generated with correct mouth shapes and mouth movements corresponding to a target audio track.

Two technical challenges are identified in respect of adapting machine learning data model architectures for the proposed usages: (1) there is a need to obtain a computational approach to disentangle expressions (visemes and lip shapes) from other properties such as pose, lighting, and overall texture; and (2), there is a need to adapt the system to realistically synthesize missing visemes (e.g., this is useful when the right viseme is not available in the input video, such as when the input video is short).

Disentanglement is utilized to identify and define a set of parameters to control the operation of a machine learning network (e.g., a generative network). Identifying and defining the set of parameters is not trivial as it is difficult to control specific output aspects of a machine learning model where many of the features are iteratively learned in a "latent space" that is difficult to explain or investigate. Disentanglement is a technical approach that enables the machine learning architecture system to manipulate certain properties of an image (such as properties of the generated image relevant to a mouth region so that the mouth region can be manipulated to match a new viseme sequence), without changing other aspects. Disentanglement can be used as a first step to computationally learn how to control the machine learning model that is later used to generate new images (e.g., the new images having modified mouth regions). The disentanglement approach can yield controllable parameters for a machine learning network, which may be a generative network, such as StyleGAN, among others.

For example, the machine learning architecture system, through using the outputs of the disentanglement approach, can be configured to keep the pose, lighting conditions, or identity of an image intact and only modify the expression. To do so, the machine learning architecture system learns separate codes or representations for every aspect of an image such as identity, expression (i.e., viseme), and pose, and the system maps them later to a single code that can generate an image with same expression, identity, and pose of the input codes.

When a latent space is generated or maintained by an autoencoder or through a mapper in a generative network like StyleGAN, "codes" are referred to low dimensional vectors that can be fed to a generator/decoder network to produce an image at inference time. Such codes are learned and are a low representation of high-dimensional data like an image.

A latent code may be represented by, for example, a vector in a multi-dimensional space, which may be a high dimensional space. When a latent space is disentangled, a direction in the latent space is associated with a corresponding property or aspect of the image, such that as a vector value moves along the direction, the corresponding property or aspect of the image is changed or modified accordingly. Such a direction in the latent space, which may be represented by the vector (e.g., the latent code), can changes only age or expression or pose of a character within the image.

Therefore, embodiments of a system architecture described herein is configured to leverage the disentangled nature of the latent space to find the direction or vector for an "expression" (e.g., shape of mouth or lips) within the image. Moving along this direction may generate all possible expressions while keeping other aspects (e.g., pose, lighting, identity) if the image constant.

A single code or a single latent code is therefore a single "point" in the latent space. This "point" represents a specific identity, in a specific pose, with a specific expression within the image.

In some embodiments, process performed by the system can include training of neural networks that can learn pose, identity, or expressions separately as a code, index, or a set of 2D or 3D points. To make sure that each code serves the right purpose, the system can replace certain codes (e.g., pose) of an image with the code with another image (another pose) and certain codes may be replaced (e.g., pose) of an image with the code with another images (another pose) and it can be ensured that all the aspects except the one correspondent to the modified code (i.e., pose) remains intact through a supervised paired training.

Viseme synthesis may involve generating 3D models with decent realism (e.g., within an acceptable range as defined by various visual metrics) in different poses and visemes. To do so, virtual cameras may be placed on a sphere with the textured 3D model which may be located on the origin. Several images may be rendered at different poses with different visemes. Then, these synthetic images may be fed to a generative image to image translation model to make them more realistic (e.g., optimizing a particular metric representative of or as a proxy for realism). For example, this generative model may be a mapper that receives a synthetic image and maps it to the distribution of realistic images. Examples of such networks can include properly trained cycleGAN or StyleGAN such as pSp.

The approaches described herein are practically implemented using computer systems that maintain trained generative adversarial models, physically implemented on computer memory and storage through refining and optimizing interconnection weights representing different hidden features in a latent space through a training process (e.g., an iterative training process).

The computer systems, in some embodiments, can include computer servers or distributed resources based "cloud" computing systems, and, for example, can be used alongside or as part of the video generation/translation/rendering process such that, for example, during post-processing, an input video (of an animation or real-life) can be processed to generate output video having audio in various output languages where the mouth regions of the output videos have been manipulated to match the target audio.

As described in further embodiments herein, additional details are proposed where a two-stage network is provided in an example system. In the example system, the system is configured for generating output video corresponding to a target set of audio instruction sets (e.g., for lip dubbing or replacement purposes).

An optional initial stage may be implemented whereby an example system in an example embodiment identifies segments in an input video V having input audio A and a target output video V' having output audio A' where lip shapes are represented via different visemes, and only for each frame of the identified segments of input video V, is configured to generate a corresponding fine reconstructed frame corresponding to visemes of output audio A'. This is a useful approach to reduce the overall computing burden, not requiring generation of image frames where the visemes are the same. In this initial stage, voices are aligned to identify similar visemes between voice segments or areas where there is silence (e.g., both are silent). For those segments, a by-pass approach can be used to simply copy frames of the input video instead of generating frames using the system. In this optional stage, a pipelining approach can be used where the identified frames/audio segments that need to be lip dubbed are provided to a processing pipeline for generation.

The system can be a physical computing appliance, such as a computer server, and the server can include a processor coupled with computer memory, such as a server in a processing server farm with access to computing resources.

As part of the processing, the system can utilize a two stage machine learning model topology, such as a voice-to-lips model (e.g., machine learning model architecture) working alongside a lips-to-image model (e.g., machine learning model architecture). The voice-to-lips model is a network that is configured to receive the geometry of a lip and animates that according to the voice. The lip-to-image model is a network that is configured to receive the personalized geometry of the lips (according to audio) along with every frame that needs to be dubbed. Each frame to be dubbed is first analyzed to extract existing lip shape (that can be used for the purpose of masking by generating a mask in some examples), and then "filling" this region (e.g., a mask region) corresponding to the given lip shapes from the personalized geometry of the lips. The filling can include in-painting, for example. The voice-to-lips and lips-to-image model networks can pretrained on many different persons or identities ("IDs") but in inference, they are fine-tuned to each speaker if video is long enough. Geometry of face (e.g., lips, chin, and/or jaw) helps the network to better predict the final reconstructed image (output dubbing). During testing, a number of variations were utilized to address issues that arose in relation to unrealistic lips, shifting lip positions, chin stretching, among others. For example, to address issues with chin location, additional landmarks could be used for chin tracking, and for lip modelling, an improved landmark extracting model can be applied to obtain more accurate lip shapes. Architecture changes are possible to promote "lip adherence", among others. These issues can further be adjusted through the use of loss weight balances, and other model changes.

An identity, or ID for short, is a synonym of a person or a character. When one or more machine learning networks are trained, pre-trained, or fine-tuned, a goal of said training, pre-training, or fine-tuning is to preserve or capture a specific person or identity's texture and style of speech.

The voice-to-lips machine learning model architecture is configured for encoding an input audio set associated with an individual as audio tokens that are transformed into synthesized lip or chip landmark data sets tuned for the individual. The model is instantiated, and trained for usage during inference. The voice-to-lips machine learning model architecture is trained to predict lip landmarks for the individual based on any video provided having image frames capturing the individual speaking. The synthesized lip or chip landmark data sets tuned for the individual are determined based on deviation from a particular identity template. The identity template for an individual can be, for example, generated from an average of all extracted landmarks from a reference video corresponding to the individual.

The lips-to-image machine learning model architecture is configured for receiving a target frame along with a landmarks code data set learned from lip or jaw geometry in the target frame and producing a rough reconstructed frame, and then receiving an appearance code based at least on the synthesized lip or chip landmark data sets and producing a fine reconstructed frame using at least both the rough reconstructed frame and the synthesized lip or chip landmark data sets. The model is instantiated, and trained for usage during inference.

The lips-to-image machine learning model architecture can utilize at least a height-width loss function which measures a difference between openness of lips between ground truth and at least one of the rough reconstructed frame and the fine reconstructed frame.

The appearance code can be a personalized code book learned for the individual, and the appearance code is utilized to establish a set of coefficients that are estimated based at least on the landmarks code data set for scaling of feature vectors.

The voice-to-lips machine learning model architecture and the lips-to-image machine learning model architecture can be pre-trained based on a plurality of different human individual identities, and can also be fine-tuned during inference time to the individual.

The target frame for replacement can be a masked frame, masked based on a maximum area that a jaw can cover in the target frame to reduce potential texture artifacts in the fine reconstructed frame, the masked frame defining an in-painting area for generation of at least one of the rough reconstructed frame and the fine reconstructed frame.

The approach described herein is useful in respect of reducing overall post-processing effort required in generating modified videos based on an input video source (e.g., where the lips are replaced in certain segments or image frames). In particular, specific adaptions are proposed that aid in improving accuracy of generated frames or portions thereof that may be personalized for one or more individuals, using improved machine learning approaches.

Machine learning approaches are useful in assisting the system to avoid issues with the "uncanny valley". For commercial implementations, it is important to have sufficient accuracy to avoid a suspension of belief by humans viewing the generated video.

The mechanism can be implemented in the form of a post-processing visual effects pipeline, for example, for TV shows, movies, and so on.

In accordance with one aspect, there is provided a computer-implemented system for generating an output video for lip dubbing, the system includes: a processor; a memory coupled to the processor and storing processor-executable instructions that, when executed, configure the processor to: receive an initial video data object V comprising a plurality of image frame data objects; receive a set of time-synchronized viseme parameters corresponding to target audio data object A'; and process the initial video data object V and the set of time-synchronized viseme parameters using a machine learning network to generate an output video data object V', wherein initial mouth regions in the initial video data object V have been replaced with replacement mouth regions generated based on the set of time-synchronized viseme parameters.

In some embodiments, the set of time-synchronized viseme parameters corresponding to the target audio data object A' are a set of parameters identified using a plurality of encoder networks adapted to disentangle expression e and pose p from a plurality of image properties.

In some embodiments, the plurality of encoder networks are iteratively trained to disentangle the expression parameters e, the pose parameters p and residual parameters r from the plurality of image frame data objects I.

In some embodiments, the processor is configured to: extract, from an initial audio data object A corresponding to initial video data object V, an initial set of expression/viseme codes corresponding to spectrogram segments in the initial audio data object A.

In some embodiments, the initial video data object V is utilized to populate a viseme library of available visemes based on the initial set of expression/viseme codes.

In some embodiments, the processor is configured to compare visemes identified in the target audio data object A' to the viseme library of available visemes based on the initial set of expression/viseme codes to identify a subset of visemes not in the viseme library and requiring synthesis.

In some embodiments, the processor is configured to generate new expression/viseme codes corresponding to the subset of visemes not in the viseme library.

In some embodiments, the processor is configured to generate the output video data object V' by replacing at least one from the plurality of image frame data objects I in its entirety with a replacement image frame data object I'.

In some embodiments, the processor is configured to generate the output video data object V' by replacing a portion of at least one from the plurality of image frame data objects I with a corresponding portion of a replacement image frame data object I', wherein the portion corresponds to a mouth region.

In some embodiments, the processor is configured to generate the output video data object V' iteratively for each character present in the initial video data object V.

In some embodiments, the machine learning network comprise a generative adversarial network.

In accordance with another aspect, there is provided a computer-generated method for generating output video, the method comprising: receiving an initial video data object V comprising a plurality of image frame data objects I; receiving a set of time-synchronized viseme parameters corresponding to target audio data object A'; and processing the initial video data object V and the set of time-synchronized viseme parameters using a machine learning network to generate an output video data object V', wherein initial mouth regions in the initial video data object V have been replaced with replacement mouth regions generated based on the set of time-synchronized viseme parameters.

In some embodiments, the set of time-synchronized viseme parameters corresponding to the target audio data object A' are a set of parameters identified using a plurality of encoder networks adapted to disentangle expression e and pose p from a plurality of image properties.

In some embodiments, the plurality of encoder networks are iteratively trained to disentangle the expression parameters e, the pose parameters p and residual parameters r from the plurality of image frame data objects I.

In some embodiments, the method may include: extracting, from an initial audio data object A corresponding to initial video data object V, an initial set of expression/viseme codes corresponding to spectrogram segments in the initial audio data object A.

In some embodiments, the initial video data object V is utilized to populate a viseme library of available visemes based on the initial set of expression/viseme codes.

In some embodiments, the method may include: comparing visemes identified in the target audio data object A' to the viseme library of available visemes based on the initial set of expression/viseme codes to identify a subset of visemes not in the viseme library and generating new expression/viseme codes corresponding to the subset of visemes not in the viseme library.

In some embodiments, the method may include: generating the output video data object V' by replacing at least one from the plurality of image frame data objects I in its entirety with a replacement image frame data object I'.

In some embodiments, the method may include: generating the output video data object V' by replacing a portion of at least one from the plurality of image frame data objects I with a corresponding portion of a replacement image frame data object I', wherein the portion corresponds to a mouth region.

In some embodiments, the method may include: generating the output video data object V' iteratively for each character present in the initial video data object V.

In accordance with yet another aspect, there is provided a system for generating output video corresponding to a target set of audio instruction sets, the system includes: a processor; a memory coupled to the processor and storing processor-executable instructions that, when executed, configure the processor to: instantiate a voice-to-lips machine learning model architecture configured for encoding an input audio set associated with an individual as audio tokens that are transformed into synthesized lip or chip landmark data sets tuned for the individual; and instantiate a lips-to-image machine learning model architecture configured for: receiving a target frame and a landmarks code data set learned from lip or jaw geometry in the target frame and producing a rough reconstructed frame; receiving an appearance code based at least on the synthesized lip or chip landmark data sets; and producing a fine reconstructed frame using at least both the rough reconstructed frame and the synthesized lip or chip landmark data sets.

In some embodiments, at least one of the voice-to-lips machine learning model architecture and the lips-to-image machine learning model architecture are pre-trained based on a plurality of different human individual identities.

In some embodiments, at least one of the voice-to-lips machine learning model architecture and the lips-to-image machine learning model architecture are fine-tuned during inference to the individual.

In some embodiments, the voice-to-lips machine learning model architecture is trained to predict lip landmarks for the individual based on any video provided having image frames capturing the individual speaking.

In some embodiments, the synthesized lip or chip landmark data sets tuned for the individual are determined based on deviation from an identity template.

In some embodiments, the identity template for an individual is generated from an average of all extracted landmarks from a reference video corresponding to the individual.

In some embodiments, the target frame is a masked frame masked based on a maximum area that a jaw can occupy in the target frame to reduce potential texture artifacts in the fine reconstructed frame, the masked frame defining an inpainting area for generation of at least one of the rough reconstructed frame and the fine reconstructed frame.

In some embodiments, the appearance code is a personalized code book learned for the individual, and the appearance code is utilized to establish a set of coefficients that are estimated based at least on the landmarks code data set for scaling of feature vectors.

In some embodiments, the lips-to-image machine learning model architecture utilizes at least a height-width loss function which measures a difference between openness of lips between ground truth and at least one of the rough reconstructed frame and the fine reconstructed frame.

In some embodiments, the processor is also configured to: identify segments in an input video V having input audio A and a target output video V' having output audio A' where lip shapes represent different visemes, and only for each frame of the identified segments of input video V, generate a corresponding fine reconstructed frame corresponding to visemes of output audio A'.

In accordance with still another aspect, there is provided a computer-implemented method for generating output video corresponding to a target set of audio instruction sets, the method comprising: instantiating a voice-to-lips machine learning model architecture configured for encoding an input audio set associated with an individual as audio tokens that are transformed into synthesized lip or chip landmark data sets tuned for the individual; and instantiating a lips-to-image machine learning model architecture configured for: receiving a target frame and a landmarks code data set learned from lip or jaw geometry in the target frame and producing a rough reconstructed frame; receiving an appearance code based at least on the synthesized lip or chip landmark data sets; and producing a fine reconstructed frame using at least both the rough reconstructed frame and the synthesized lip or chip landmark data sets.

In some embodiments, at least one of the voice-to-lips machine learning model architecture and the lips-to-image machine learning model architecture are pre-trained based on a plurality of different human individual identities.

In some embodiments, at least one of the voice-to-lips machine learning model architecture and the lips-to-image machine learning model architecture are fine-tuned during inference to the individual.

In some embodiments, the voice-to-lips machine learning model architecture is trained to predict lip landmarks for the individual based on any video provided having image frames capturing the individual speaking.

In some embodiments, the synthesized lip or chip landmark data sets tuned for the individual are determined based on deviation from an identity template.

In some embodiments, the identity template for an individual is generated from an average of all extracted landmarks from a reference video corresponding to the individual.

In some embodiments, the target frame is a masked frame masked based on a maximum area that a jaw can occupy in the target frame to reduce potential texture artifacts in the fine reconstructed frame, the masked frame defining an inpainting area for generation of at least one of the rough reconstructed frame and the fine reconstructed frame.

In some embodiments, the appearance code is a personalized code book learned for the individual, and the appearance code is utilized to establish a set of coefficients that are estimated based at least on the landmarks code data set for scaling of feature vectors.

In some embodiments, the lips-to-image machine learning model architecture utilizes at least a height-width loss function which measures a difference between openness of lips between ground truth and at least one of the rough reconstructed frame and the fine reconstructed frame.

In some embodiments, the method may include: identifying segments in an input video V having input audio A and a target output video V' having output audio A' where lip shapes represent different visemes, and only for each frame of the identified segments of input video V, generating a corresponding fine reconstructed frame corresponding to visemes of output audio A'.

In some embodiments, there is provided a non-transitory computer readable medium, storing machine interpretable instruction sets, which, when executed by a processor, cause the processor to perform the steps of a method according to any one of the methods above.

The system can be implemented as a special purpose machine, such as a dedicated computing appliance that can operate as part of or as a computer server. For example, a rack mounted appliance that can be utilized in a data center for the specific purpose of receiving input videos on a message bus as part of a processing pipeline to create output videos. The special purpose machine is used as part of a post-production computing approach to visual effects, where, for example, editing is conducted after an initial material is produced. The editing can include integration of computer graphic elements overlaid or introduced to replace portions of live-action footage or animations, and this editing can be computationally intense.

The special purpose machine can be instructed in accordance to machine-interpretable instruction sets, which cause a processor to perform steps of a computer implemented method. The machine-interpretable instruction sets can be affixed to physical non-transitory computer readable media as articles of manufacture, such as tangible, physical storage media such as compact disks, solid state drives, etc., which can be provided to a computer server or computing device to be loaded or to execute various programs.

In the context of the present disclosed approaches, the pipeline receives inputs for post-processing, which can include video data objects and a target audio data object. The system is configured to generate a new output video data object that effectively replaces certain regions, such as regions of the mouth regions.

Variations of computing architecture are proposed herein. For example, in an exemplar embodiment, a single U-net is utilized that exhibits strong performance in experimental analysis.

Variations of masking approaches are also proposed, for example, an improved mask that extends the mask region into the nose region instead of just below the nose, which was also found to exhibit strong performance in experimental analysis.

BRIEF DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 18A and FIG. 18B is an example process flow, according to some embodiments. FIG. 18A extends onto FIG. 18B.

DETAILED DESCRIPTION

The quantity of content available on TV is rapidly expanding. Foreign movies are becoming more popular in English-speaking countries, and international streaming platforms have facilitated access to English content for non-English speakers.

To better engage audiences that speak in a language different from that of the movie in question, it is desirable to translate the movie's script and then perform dubbing. However, audio dubbing alone does not match the lip movements of speakers and may result in inconsistent timing. Therefore it is necessary to manipulate the lip movements to match the dubbed movie in any given language.

As a result, there is a clear and growing need for systems and methods that given video V in language L and audio A, may manipulate V to obtain V' based on audio A' in language L' so that the lips in V' match audio A'. For example, audio A may be in English and audio A' may be in French.

This presents a challenging technical problem, because video is often in a high quality and high resolution, such as 4K or greater, and a subtle mismatch or slight noise can make noticeable artifacts that should ideally be corrected and removed. As described herein, a solution is proposed to provide a system that is specially configured to generate improved video data object V' having modified regions (e.g., a mouth region covering lips and surrounding regions).

The technical solution, in a variation, also includes a viseme synthesis step for synthesizing visemes that are useful for generating V' but are not present in original V (e.g., original audio language does not have actors making a particular lip or mouth expression for a target viseme), as well as a disentanglement step that can be used to identify the control parameters needed to send to a generator for the generation of V' based on a set of time-coded input visemes (e.g., corresponding to A', the audio track in the target language).

Figure 1:
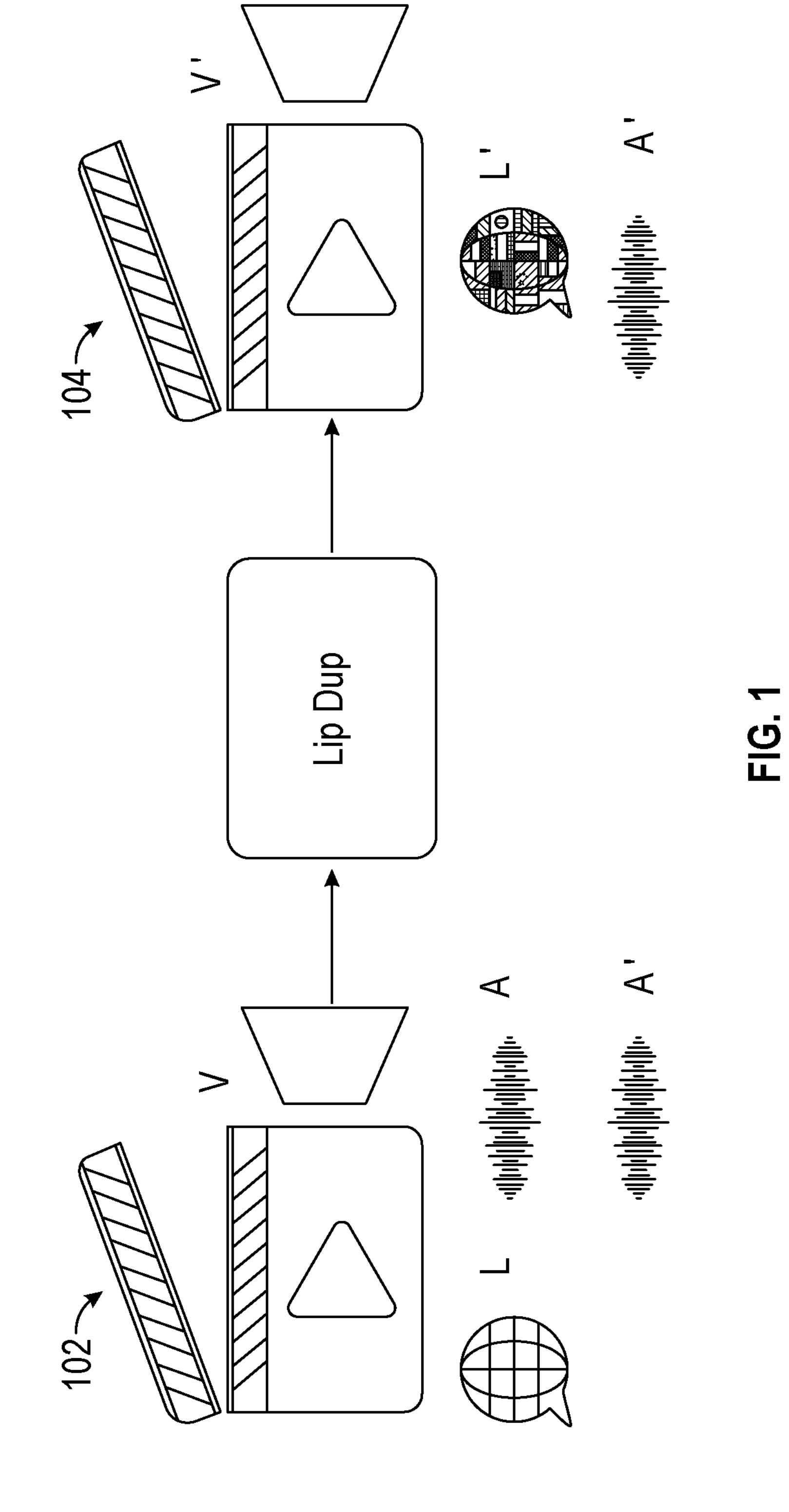
FIG. 1 is a pictorial diagram showing an example lip dub system, according to some embodiments.

FIG. 1 is a pictorial diagram showing an example lip dub system 100, according to some embodiments.

System 100 includes input 102, with video V with audio A in language L, and audio A' which is the translated audio A in language L'. The output result 104 is video V' with audio A' in language L', arranged in a way such that frames of video V' are matched with their respective frames of audio A'.

In some embodiments, video V includes frames F and audio A in language L, in addition to audio A' in language L'. System 100 will manipulate frames F so that each frame $I \in F$ is manipulated to obtain $I' \in F'$ that matches audio A'.

To match frames to audio segments, a deep neural network can be implemented that receives frames $I \in F$ and its corresponding spectrogram unit $s \in A'$, and produces frame I' that matches s.

Figure 2:
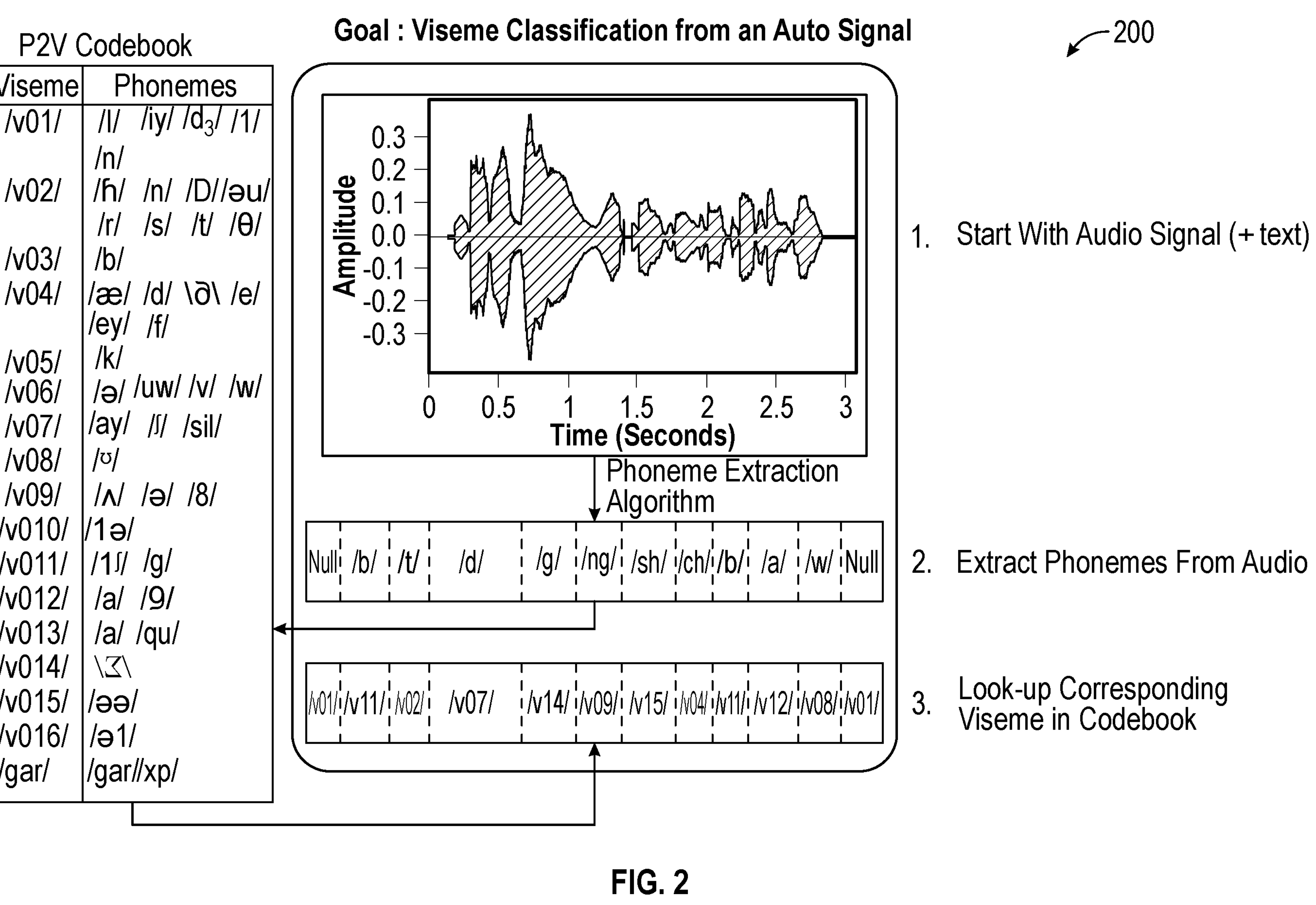
FIG. 2 is an illustrative diagram of a process for breaking audio into phonemes and retrieving associated visemes, according to some embodiments.

FIG. 2 is an illustrative diagram of process 200, breaking audio into phonemes and retrieving associated visemes, according to some embodiments.

In phonology and linguistics, there exist phonemes and visemes. A phoneme is a unit of sound that distinguishes one word from another in a particular language. For instance, in most dialects of English, the sound patterns /sIn/ (sin) and /sIη/ (sing) are two separate words which can be distinguished by the substitution of one phoneme, /n/, for another phoneme, /η/.

A viseme is any of several speech sounds that look the same, for example, when lip reading. It should be noted that visemes and phonemes do not share a one-to-one correspondence. For a particular audio track, phonemes and visemes can be time-coded as they appear on screen or on audio, and this process can be automatically conducted or manually conducted. Accordingly, A' can be represented in the form of a data object that can include a time-series encoded set of phonemes or visemes. For a phoneme representation, it can be converted to a viseme representation through a lookup conversion, in some embodiments, if available. In another embodiment, the phoneme/viseme connection can be obtained through training a machine learning model through iterative cycles of supervised training data sets having phonetic transcripts and the corresponding frames as value pairs.

Often, a single viseme can correspond to multiple phonemes because several different phonemes appear the same on the face or lips when produced. For instance, words such as pet, bell, and men are difficult for lip-readers to distinguish, as they all look like /pet/. Or phrases, such as "elephant juice", when lip-read, appears identical to "I love you".

As an example of time-series encoded set of phonemes, and also shown in FIG. 2, for A', a time stamped list of phonemes labelling the entire sequence can be generated according to the phoneme detected.

Time-series encoded set of visemes are represented landmarks. For instance, for every frame in a source video (contingent on framerate of the source video), a landmark set is retrieved or generated, the set indicating a new viseme to match for that frame. If there are 600 frames in the source video, there may be 600 landmark sets. The time-series or time stamps in this case, can include frame correspondence.

Phonemes time-coding (for producing time-series encoded set of phonemes) can be seen as operating on "continuous" time space (though audio is still sampled). While visemes time-coding (for producing time-series encoded set of visemes) are coded to discrete frame space.

A phoneme to viseme (P2V) codebook can be used to classify various different phonemes with their corresponding visemes. The P2V codebook, for example, could be a data structure representing a lookup table that is used to provide a classification of phoneme with a corresponding viseme. The classification is not always 1:1 as a number of phonemes can have a same viseme, or similarly, contextual cues may change a viseme associated with a particular phoneme.

Other properties of the face (e.g., angriness) can be preserved by disentangling viseme from other properties of the image.

Starting with audio signal A as well as the related text, audio A is broken into segments $s_i$ to find corresponding phoneme $p_i$. From $p_i$, a corresponding viseme vi is determined or extracted. If the desired visemes and poses are available in an input video (see FIG. 11), they can be retrieved from the original input, otherwise they may need to be generated as described herein using a proposed disentanglement model. In some embodiments, desired visemes can also be obtained from a library associated with a particular actor or character in other speaking roles in other videos.

Visemes are added to a viseme database that may be synthesized beforehand, described further below.

Ideally, any lip movement could be constructed by combining images representing these visemes.

However, such images that portray a specific viseme vary in pose, lighting conditions, among other varying factors. As a result, a mechanism to manipulate these frames to match them to specific visemes (expressions), poses, lighting conditions, among other varying factors, can be applied.

In some embodiments, the process includes classifying visemes or learn a code for each image. Then, by replacing one code and changing others, the machine learning model architecture ideally only ends up changing one aspect of the image (e.g., the relevant mouth region).

A code may be a vector of length N. Depending on the machine learning model architecture, which can include a generator network such as StyleGAN, the length N and how the code is determined may differ.

Figure 3:
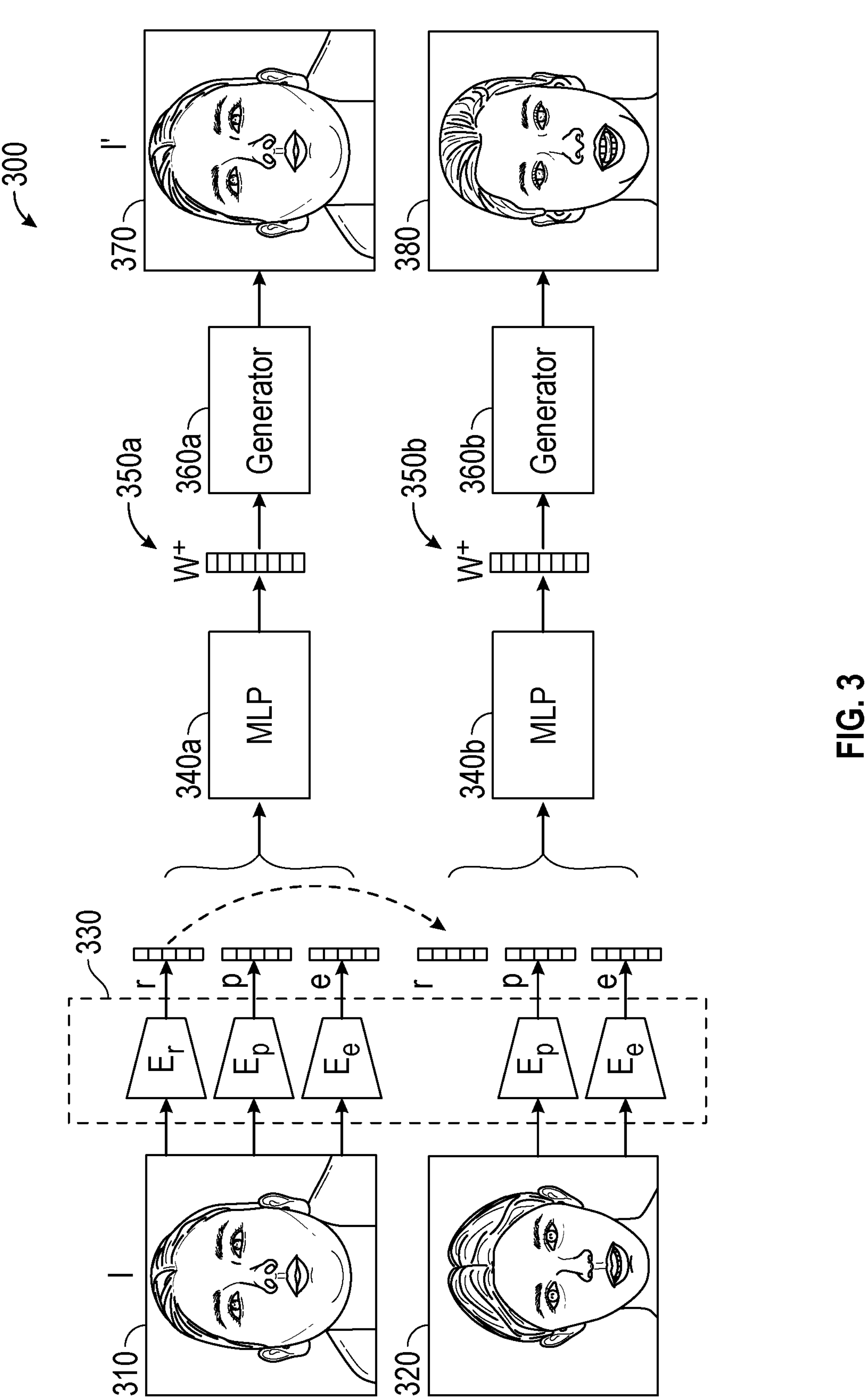
FIG. 3 is a block diagram of a disentanglement process, in which images are encoded into disentangled codes that have all the information of the images, according to some embodiments.

For instance, an example of a learned code is shown as w+ in FIG. 3. The machine learning model architecture may learn a code by finding some code that when given to the generator network, produces the same image.

Then the machine learning model architecture is trained to find the modification required to that code to generate the desired viseme while maintaining all other properties of the image. When modifying the image, a code for an "open mouth" shape of a person in the image should not make the hair red.

As a non-limiting example of process 200, audio with text may be received, and phonemes extracted from said received audio. These identified phonemes may then be assigned the appropriate viseme, which can be done using a suitable P2V Codebook to look-up the corresponding visemes.

Each frame $I \in F$ is composed of expression e that contains the geometry of the lips and mouth (i.e., visemes) and texture, an identification string or number (ID) that distinguishes one individual from the other, along with a pose p that specifies the orientation of a face.

In dubbing applications, only relevant facial expressions may be modified according to spectrogram s, while pose p and everything else (residual r) may be kept intact. Therefore, the core neural network learns to disentangle e, r, and p from I.

FIG. 3 is a block diagram of disentanglement 300, in which images are encoded into disentangled codes that retain all the information of the images, according to some embodiments.

Disentanglement is a technique that breaks down, or disentangles, features into narrowly defined variables and encodes them as separate dimensions. The goal of disentanglement is to mimic quick intuitive processes of the human brain, using both "high" and "low" dimension reasoning.

In the shown example embodiment, disentanglement 300, image frames 310, 320 are processed, by a plurality of encoders 330, into three disentangled codes representing pose, expression (viseme), and residuals, that have all the information of the images. To train, identity should be preserved as well as paired images with the same pose, identity, or ID. Paired data used for disentanglement can be encapsulated or represented in different forms (e.g., vector, integer number, 2D/3D points, etc.). In some embodiments, the approach includes an intentional overfitting to the input video achieve improved results.

The non-limiting described neural network uses three encoders that are used to disentangle expression e, and pose p from other properties of the images including ID, background, lighting, among other image properties. The codes of these image properties are integrated into a code $w^+$ 350*a*, 350*b* via a multilayer perceptron (MLP) network 340*a*, 340*b*. $w^+$ 350*a*, 350*b* may be passed to a pre-trained generator 360*a*, 360*b*, such as StyleGAN, to generate a new image I' 370, 380.

A MLP network 340*a*, 340*b* is a type of neural network, and are comprised of one or more layers of neurons. Data is fed to the input layer, then there may be one or more hidden layers which provide levels of abstraction, then predictions are made on an output layer, or the "visible layer".

The encoders 330 and the MLP network 340*a*, 340*b* may be trained on identity tasks, meaning that I and I' are the same, as well as on a paired data set for which I and I' are paired and they differ in one or two properties, such as ID, pose, or expression, for example. For the purpose of lip dubbing, expressions may be taken from the viseme database. During output video generation, I' may be either full images or selected mouth regions, and either can be inserted to generate the replacement video frames. Inserting just the mouth regions could be faster and less computationally expensive, but it could have issues with bounding box regions and incongruities in respect of other aspects of the video that are not in the replacement region.

Training is described with further detail below.

Figure 4:
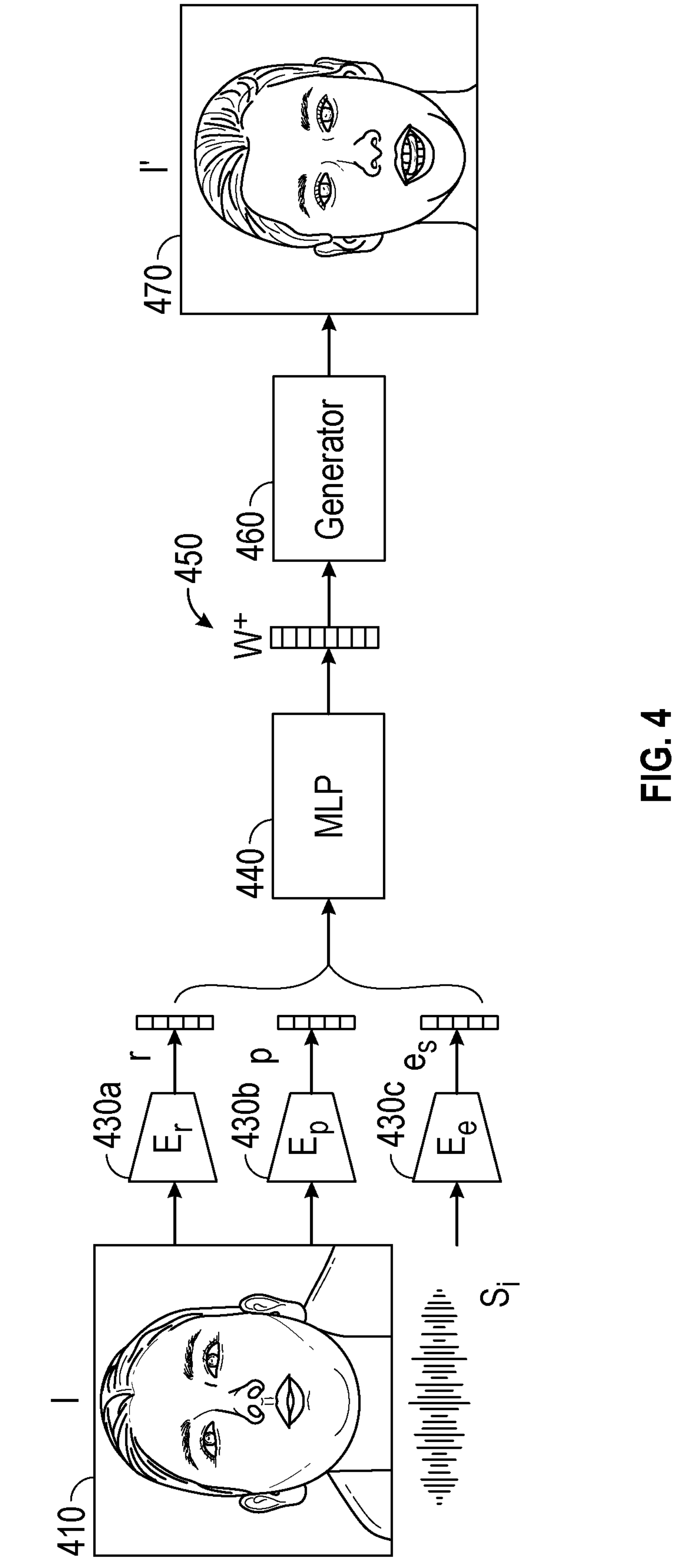
FIG. 4 is a block diagram of a lib dubbing process, in which the code of expression (visemes) is extracted from the audio and is added to the codes of input frames to obtain output frames, synchronized with audio segments, according to some embodiments.

FIG. 4 is a block diagram of lib dubbing process 400, in which the code of expression (visemes) is extracted from the audio and is added to the codes of input frames to obtain output frames, synchronized with audio segments, according to some embodiments.

The codes of input frames here can be generated using a latent space inversion (or encoding) process.

Modification to the vector or the code allows semantic modification of the image when passed back through a generator. For example, moving along the "age" direction represented by the vector in latent space will age the person in the generated image.

An image frame I 410 are processed, by a plurality of encoders 430*a*, 430*b*, 430*c*, into three disentangled codes representing pose p, expression (viseme) e, and residuals r, that have all the information of the images.

The non-limiting embodiment process 400 herein implements three encoders 430*a*, 430*b*, 430*c* that are used to disentangle expression e, and pose p from other properties of the images including ID, background, lighting, among other image properties. The codes of these image properties are integrated into a code $w^+$ 450 via a multilayer perceptron (MLP) network 440. $w^+$ 450 may be passed to a pre-trained generator 460, such as StyleGAN, to generate a new image I' 470.

In some embodiments, a separate audio track for each individual character is obtained (or extracted from a combined audio track). Heads and faces, for example, can be identified by using a machine learning model to detect faces to establish normalized bounding boxes. Distant and near heads may have different approaches, as near heads may have a larger amount of pixels or image regions to modify, whereas more distant heads have a smaller amount of pixels or image regions to modify.

To perform the lib dubbing process 400 shown in the example embodiment, the code of expressions (visemes) is extracted from the audio and is added to the codes of frame I to obtain frame I' that is synchronized with audio segment.

To perform lip dubbing, audio A' goes through a viseme identification process, such that a viseme can be found for each spectrogram segment $s_i$. The system can be configured to map audio to phonemes and then map phonemes to visemes.

For example, 19 visemes can be considered and indexed by a single unique integer (1-19). Spectrogram si may then be passed to another encoder or a separate module (such as a phoneme to viseme module) to produce an expression I viseme code from $s_i$ called $e_s$. Input video may or may not have the viseme in the same pose as I. If V already has the same viseme and pose, it can simply be retrieved (see FIG. 11). If not, first I is encoded into three latent codes containing eS, r, and p. Then, instead $e_s$, r, and p are passed to a decoder to generate a new frame I' that preserves ID, pose, among others, while it matches the expression $e_s$ coming from the audio.

In some embodiments, it may be possible to only take the mouth region from I' and insert it into I and perform an image harmonization to generate a smooth result.

It should be noted that latent codes can be of any size or form, including hot code, single integer value, or a vector of floats in any size.

In other embodiments, it may be preferable to reproduce the entire/ I' or to create only the lip shape and insert that back into I.

In addition, if the right pose and expression are already available in the input video V, the appropriate frame may simply be retrieved from video V. In cases where such a frame does not exist, a new frame may be generated using the discussed process. The described example generator may be likely to use a StyleGAN, or a variation thereof.

In some embodiments, an additional feedback process is contemplated using a lip reading engine that automatically produces video I text of the output, which is then fed back to the system to compare against the input to ensure that the output video is realistic.

Figure 5:
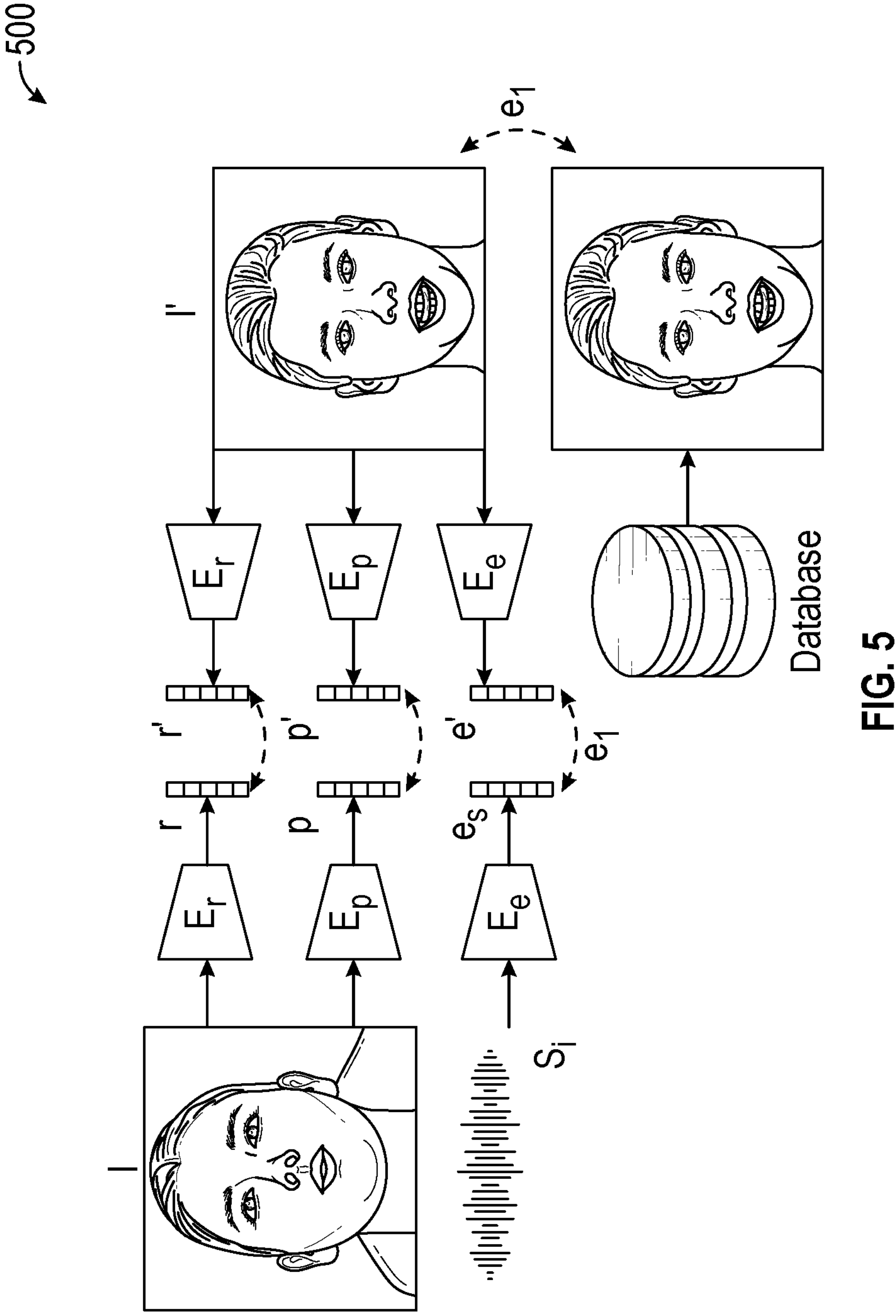
FIG. 5 is a block diagram showing a disentanglement network training process, in which losses are defined on latent codes, and on images with the correct pose and expressions from a database, according to some embodiments.

FIG. 5 is a block diagram of disentanglement network training process 500, in which losses are defined on latent codes, and on images with the correct pose and expressions from a database, according to some embodiments.

For training process 500, of what may be the first disentanglement network, according to some embodiments, I and I', have been paired, and have been improved in terms of realism through pSp.

Pixel2style2pixel (pSp) is an image-to-image translation framework. The pSp framework provides a fast and accurate solution for encoding real images into the latent space of a pre-trained StyleGAN generator. In addition, the pSp framework can be used to solve various image-to-image translation tasks, such as multi-modal conditional image synthesis, facial frontalization, inpainting and super-resolution, among others.

In some embodiments, pSp may be used to map images created in a synthetic environment with different visemes, poses and textures, to realistically looking images.

To do so, synthetic images may be fed to pSp and generate code $w_0$.

In further embodiments, a code may also be sampled in the realistic domain called $w_1$. By mixing top entries of $w_0$ with bottom entries of $w_1$, expressions (e.g., viseme) and pose of the synthetic image captured in $w_0$ may be preserved, and produce realistic images with appearance similar to the realistic image with code $w_1$. By sampling different images and producing various $w_1$, some embodiments may produce an abundant number of labeled realistic images in certain poses and visemes dictated by the synthetic data. This labeled realistic data may be used for learning disentanglement.

Loss $L_1$ (e.g., |xi-xj|) can be defined on the result and ground truth. I' can also be fed back to the video encoder to obtain r', p', and e' and compare them against the input codes. To do so, a loss Ly can be defined on r', p', and e' against i, p, and $e_s$. To ensure that the new lips are valid, the closest image with r, p, and $e_s$ in the database should be retrieved.

Figure 6:
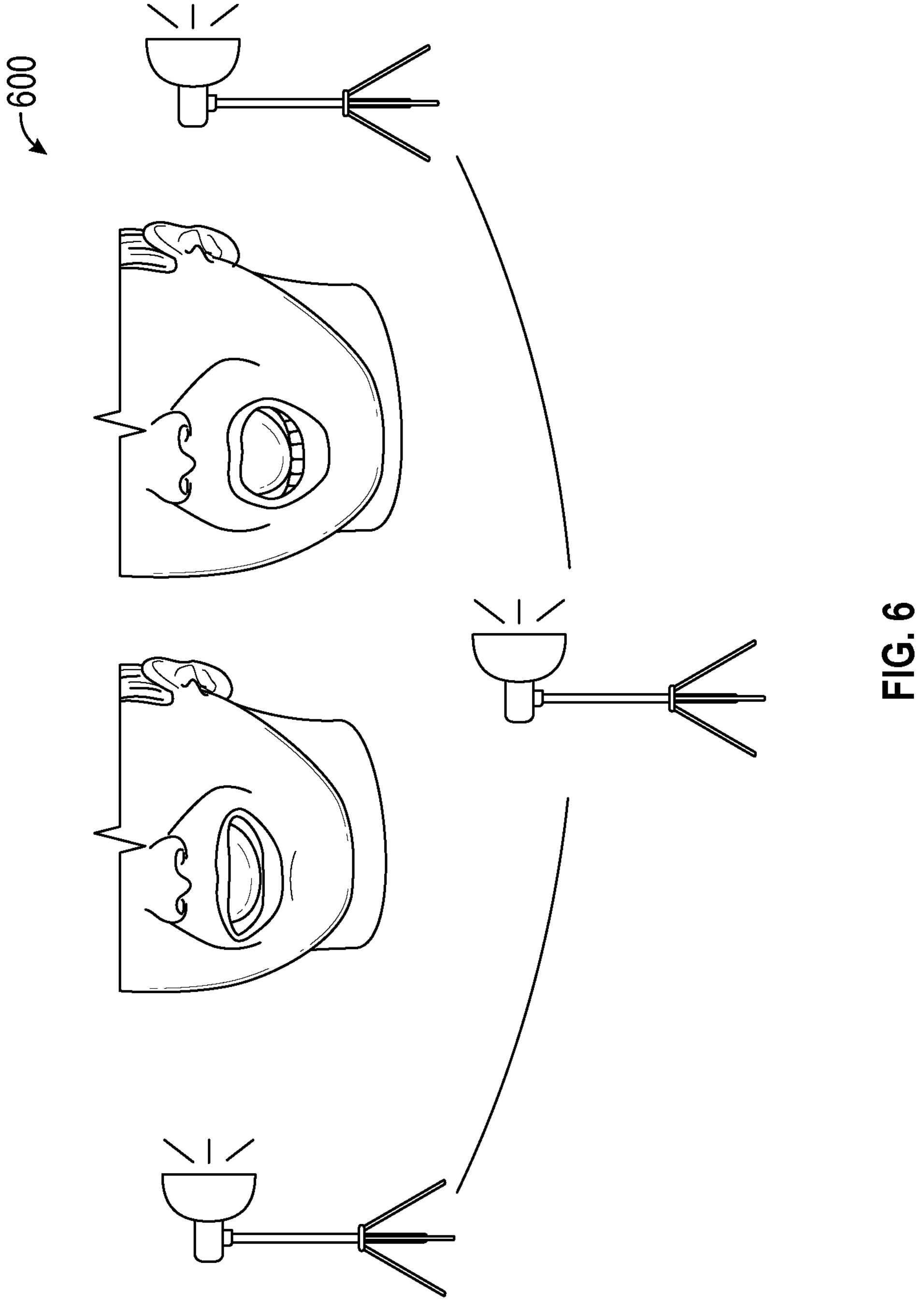
FIG. 6 is an illustrative diagram of an approach for data synthesis, with different poses and expressions (visemes), according to some embodiments.

FIG. 6 is a illustrative diagram of data synthesis 600, with different poses and expressions (visemes), according to some embodiments.

To disentangle different properties of frames, relevant datasets are needed. To generate such datasets, data can be synthesized with different identities that are rendered at different poses and expressions. These expressions include all the available visemes that may be needed to produce an effective lip dub.

The uncanny valley in aesthetics, is a hypothesized relation between an object's degree of resemblance to a human being and the emotional response to said object. The hypothesis suggests that humanoid objects that imperfectly resemble actual humans provoke "uncanny" familiar feelings of eeriness and revulsion in observers. The "valley" refers to a sharp dip in a human observer's affinity for the replica, which otherwise increases with the replica's human likeness. For example, certain lifelike robotic dolls, which appear almost human, risk eliciting cold, eerie feelings in viewers.

To overcome the uncanny valley, and produce more realistic images, the synthetic datasets will be fed to pSp to produce natural images with different IDs.

Thus, according to some embodiments, the described systems learn to disentangle expressions (visemes and lip shapes) from other properties such as pose, lighting, and overall texture. Therefore, data is needed to learn how to disentangle these properties.

Further embodiments realistically synthesize missing visemes. This is needed when the correct viseme is not available in the input video. This may be particularly useful when the input video is short. According to some embodiments, this is done by leveraging the system to generate synthetic data in different poses and IDs, and the extra steps, described above in data synthesis 600, may be performed to make them more realistic.

Figure 7:
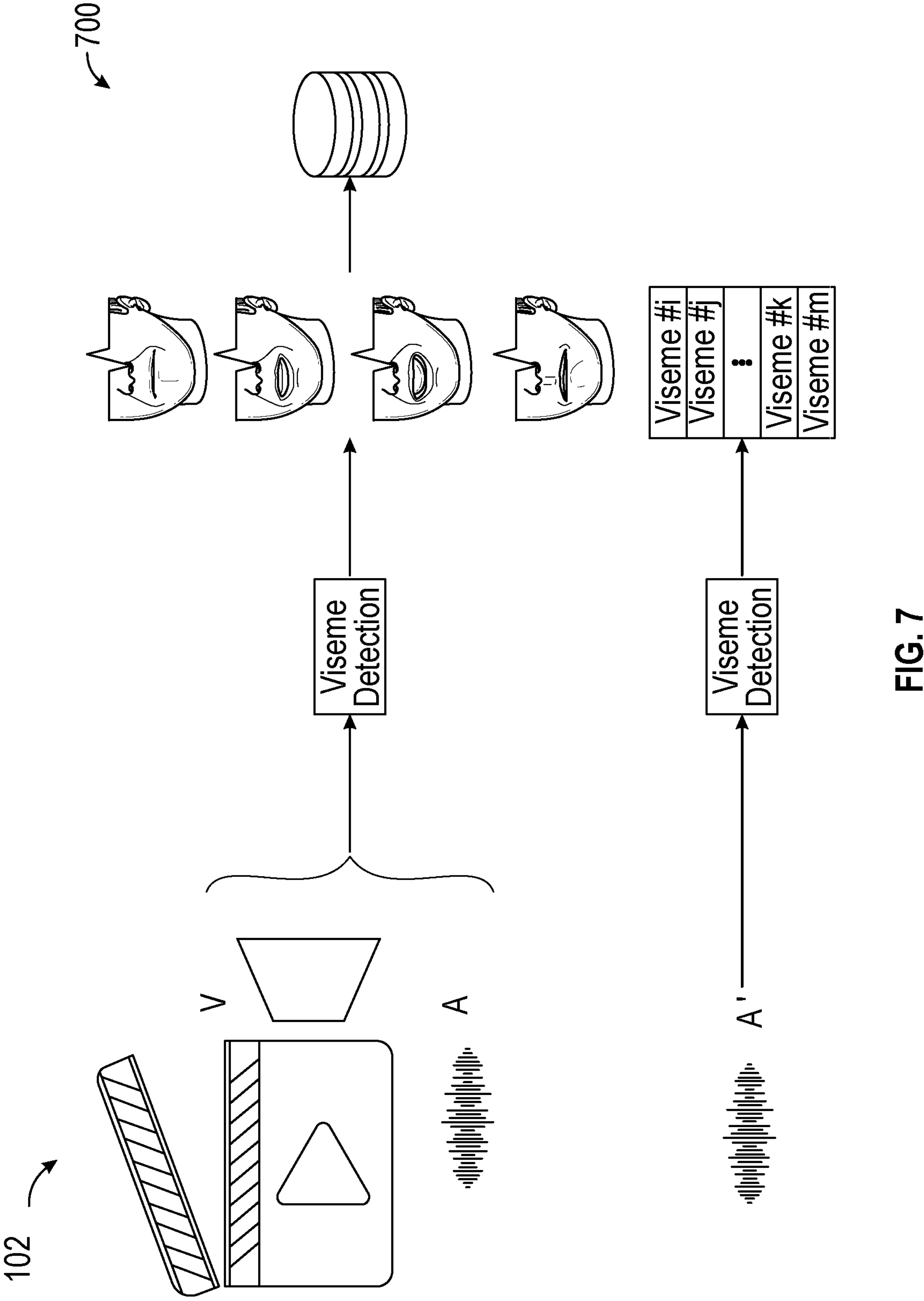
FIG. 7 is a flowchart block diagram depicting pre-processing of input video and audio.

FIG. 7 is a flowchart block diagram 700 depicting preprocessing of input video and audio.

In some embodiments, lip dubbing may be composed of two parts. Flowchart 700 depicts part one, pre-processing. In pre-processing, visemes of the input 102 are found and added to the database. Audio A' is processed to identify the viseme codes of its audio segments.

Part two according to said embodiment involves lip dubbing.

Figure 8:
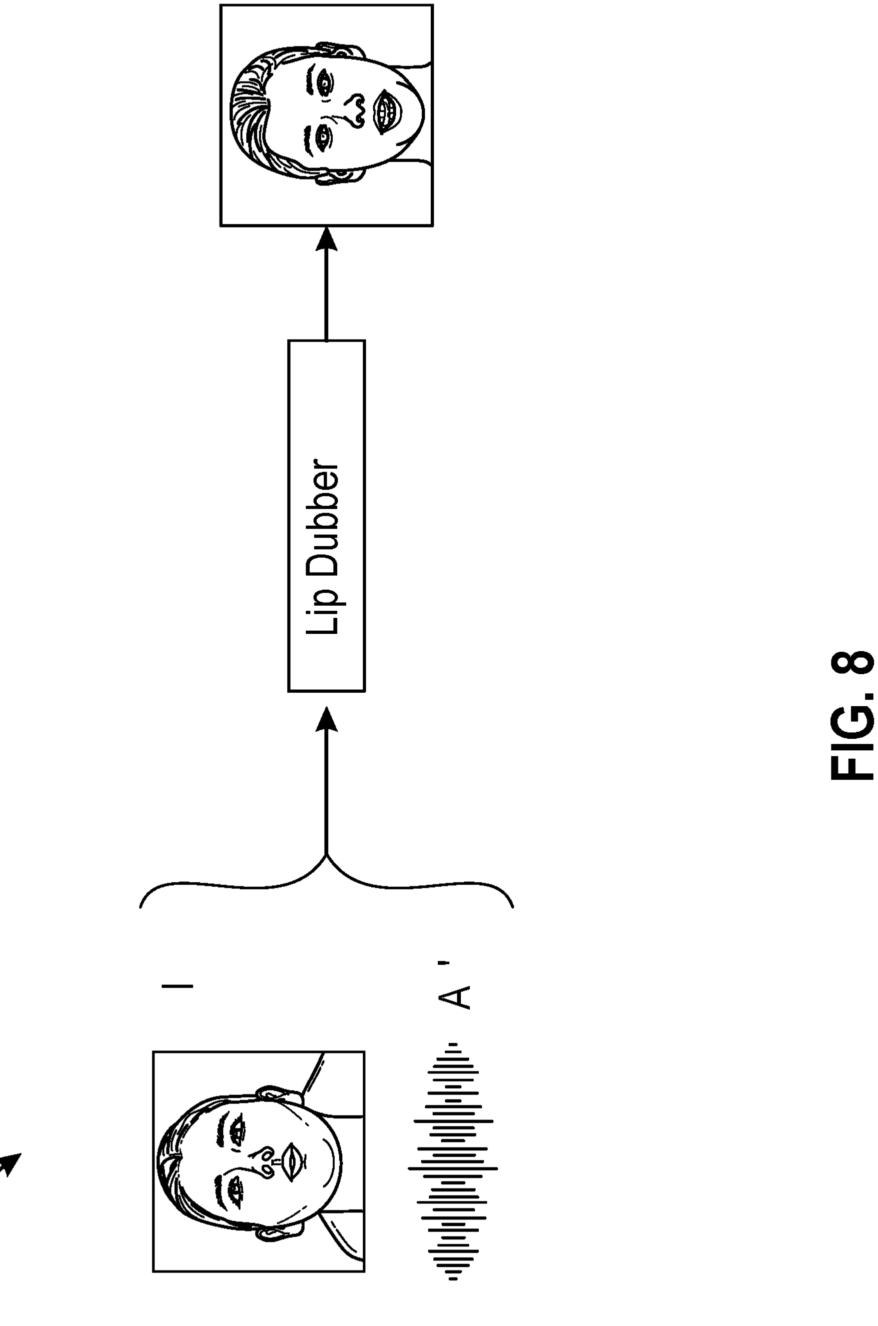
FIG. 8 is a flowchart block diagram depicting Lip Dubber system performance, as shown in FIG. 4.

FIG. 8 is a flowchart block diagram 800 depicting Lip Dubber performance, as shown in FIG. 4. According to viseme codes of audio A', the Lip Dubber depicted in FIG. 4 may be used to modify frames of video V.

Figure 9:
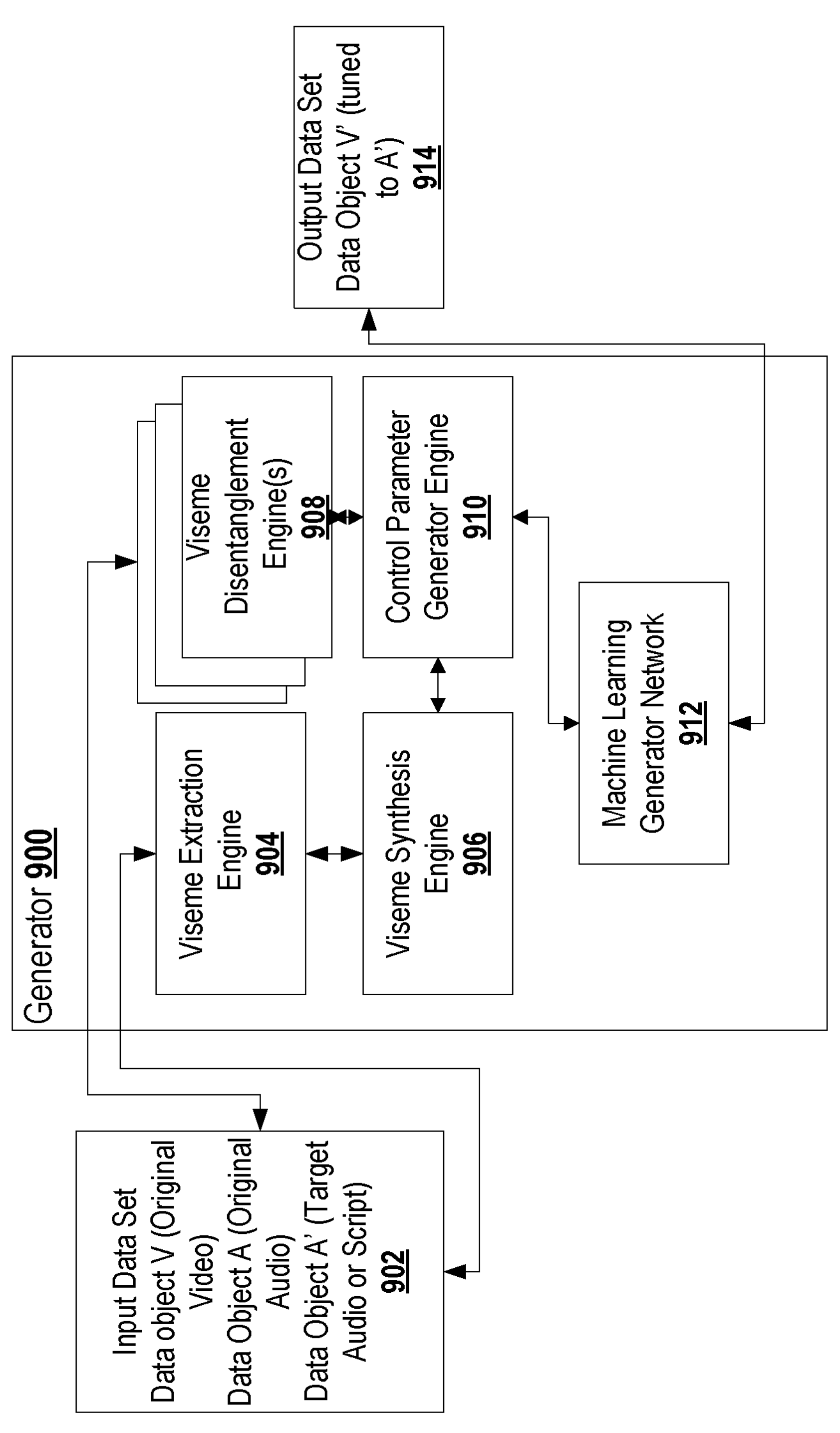
FIG. 9 is a block schematic diagram of a computational system adapted for use in video generation, according to some embodiments.

FIG. 9 is a block schematic diagram of a computational system 900 adapted for use in video generation, according to some embodiments.

The system can be implemented by a computer processor or a set of distributed computing resources provided in respect of a system for generating special effects or modifying video inputs. For example, the system can be a server that is specially configured for generating lip dubbed video outputs where input videos are received and a translation subroutine or process is conducted to modify the input videos to generate new output videos.

As described above, the system 900 is a machine-learning engine based system includes various maintained machine learning models that are iteratively updated and/or trained, having interconnection weights and filters therein that are tuned to optimize for a particular characteristic (e.g., through a defined loss function). Multiple machine learning models may be used together in concert, for example as described herein, a specific set of machine learning models may be first used to disentangle specific parameters for ultimately controlling a video generator hallucinatory network.

The computational elements shown in FIG. 9 are shown as examples and can be varied, and more, different, less elements can be provided. Furthermore, the computational elements can be implemented in the form of computing modules, engines, code routines, logical gate arrays, among others, and the system 900, in some embodiments, is a special purpose machine that is adapted for video generation (e.g., a rack mounted appliance at a computing data center coupled to an input feed by a message bus).

This system can be useful, for example, in computationally automating previously manual lip dubbing/redrawing exercises, and overcome issues relating to prior approaches are lip dubbing, where the replacement voice actors/actresses in the target language either had to match syllables with the original lip movements (resulting in awkward timing or scripts in the target language), or have on screen lip movements that do not correspond properly with the audio in the target language (the mouth moves but there is no speech, or there is no movement but the character is speaking).

An input data set is obtained at 902, for example, as a video feed provided from a studio or a content creator, and can be provided, for example, as streamed video, as video data objects (e.g., .avi, .mp4, .mpeg). The video feed may have an associated audio track that may be provided separately or together. The audio track may be broken down by different audio sources (e.g., different feed for different on-screen characters from the recording studio).

A target audio or script can be provided, but in some embodiments, it is not provided and the target audio or script can be synthesized using machine learning or other generative approaches. For example, instead of having new voice actors speak in a new language, the approach obtains a machine translation and automatically uses a generated voice.

The viseme extraction engine 904 is adapted to identify the necessary visemes and their associated timecodes from the target audio or script. These visemes can be extracted from phonemes in some examples, if phonemes are provided, or extracted from video using a machine learning engine. The visemes can be mapped to a list of all visemes and stored as tuples (e.g., viseme 14, t=0.05-0.07 s, character Alice; viseme 13, t=0.04-0.08 s, character Bob).

The viseme synthesis engine 906 is configured to compare the necessary visemes with the set of known visemes from the original video data object, and conduct synthesis as necessary of visemes missing from the original video data object. This synthesis can include obtaining visemes from other work from a same actor, generating all new mouth movements from an "eigenface", among others.

The viseme disentanglement engine(s) 908 is a set of machine learning models that are individually tuned to decompose or isolate mouth movement-related movements associated with various visemes when controlling the machine learning generator network 912, which are then used to generate control parameters using control parameter generator engine 910.

The machine learning generator network 912 (e.g., StyleGAN or another network) is then operated to generate new frame objects whenever a person or character is speaking or based on viseme timecodes for the target visemes. The frame objects can be partial or full frames, and are inserted into V to arrive at V' in some embodiments. In some embodiments, instead of inserting into V, V' is simply fully generated by the machine learning generator network 912.

An output data set 914 is provided to a downstream computing mechanism for downstream processing, storage, or display. For example, the system can be used for generating somewhat contemporaneous translations of an ongoing event (e.g., a newscast), movie/TV show/animation outputs in a multitude of different languages, among others. In another embodiment, the output data set 914 is used to re-dub a character in a same language (e.g., where the original audio is unusable for some reason or simply undesirable). Accents may also be modified using the system (e.g., different English accents, Chinese accents, etc. may be corrected).

For example, the output data set 914 can be used for post-processing of animations, where instead of having initial faces or mouths drawn in the original video, the output video is generated directly based on a set of time-synchronized visemes and the mouth or face regions, for example, are directly drawn in as part of a rendering step. This reduces the effort required for preparing the initial video for input.

In yet another further example, the viseme data is provided and the system that generates video absent an original input video, and an entirely "hallucinated" video based on a set of instruction or storyboard data objects is generated with correct mouth shapes and mouth movements corresponding to a target audio track.

Figure 10:
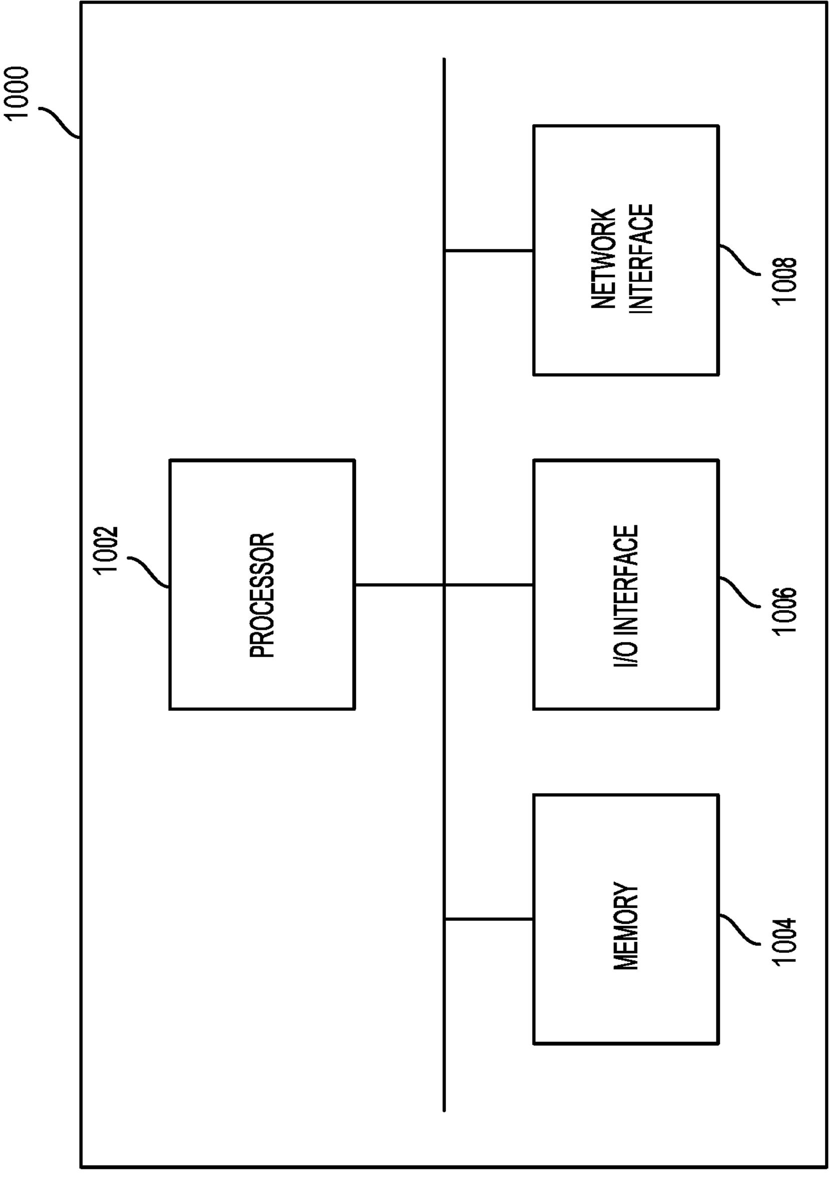
FIG. 10 is a block schematic diagram of a computer system, according to some embodiments.

FIG. 10 is an example computational system, according to some embodiments. Computing device 1000, under software control, may control a machine learning model architecture in accordance with the block schematic shown at FIG. 9.

As illustrated, computing device 1000 includes one or more processor(s) 1002, memory 1004, a network controller 1006, and one or more I/O interfaces 1008 in communication over a message bus.

Processor(s) 1002 may be one or more Intel x86, Intel x64, AMD x86-64, PowerPC, ARM processors or the like.

Memory 1004 may include random-access memory, read-only memory, or persistent storage such as a hard disk, a solid-state drive or the like. Read-only memory or persistent storage is a computer-readable medium. A computer-readable medium (e.g., a non-transitory computer readable medium) may be organized using a file system, controlled and administered by an operating system governing overall operation of the computing device.

Network controller 1006 serves as a communication device to interconnect the computing device with one or more computer networks such as, for example, a local area network (LAN) or the Internet.

One or more I/O interfaces 1008 may serve to interconnect the computing device with peripheral devices, such as for example, keyboards, mice, video displays, and the like. Such peripheral devices may include a display of device 120. Optionally, network controller 1006 may be accessed via the one or more I/O interfaces.

Software instructions are executed by processor(s) 1002 from a computer-readable medium. For example, software may be loaded into random-access memory from persistent storage of memory 1004 or from one or more devices via I/O interfaces 1008 for execution by one or more processors 1002. As another example, software may be loaded and executed by one or more processors 1002 directly from read-only memory.

Example software components and data stored within memory 1004 of computing device 1000 may include software to perform machine learning for generation of hallucinated video data outputs, as disclosed herein, and operating system (OS) software allowing for communication and application operations related to computing device 1000.

In accordance with an embodiment of the present application, a video V (image frames F+voice $w_a$) is given in language L (e.g., English) along with a voice $w_b$ in language L' (e.g., French) are given. FIGS. 11-17 illustrate various processes that may be used to replace the lip shapes in video V according to the voice in language L'.

Figure 11:
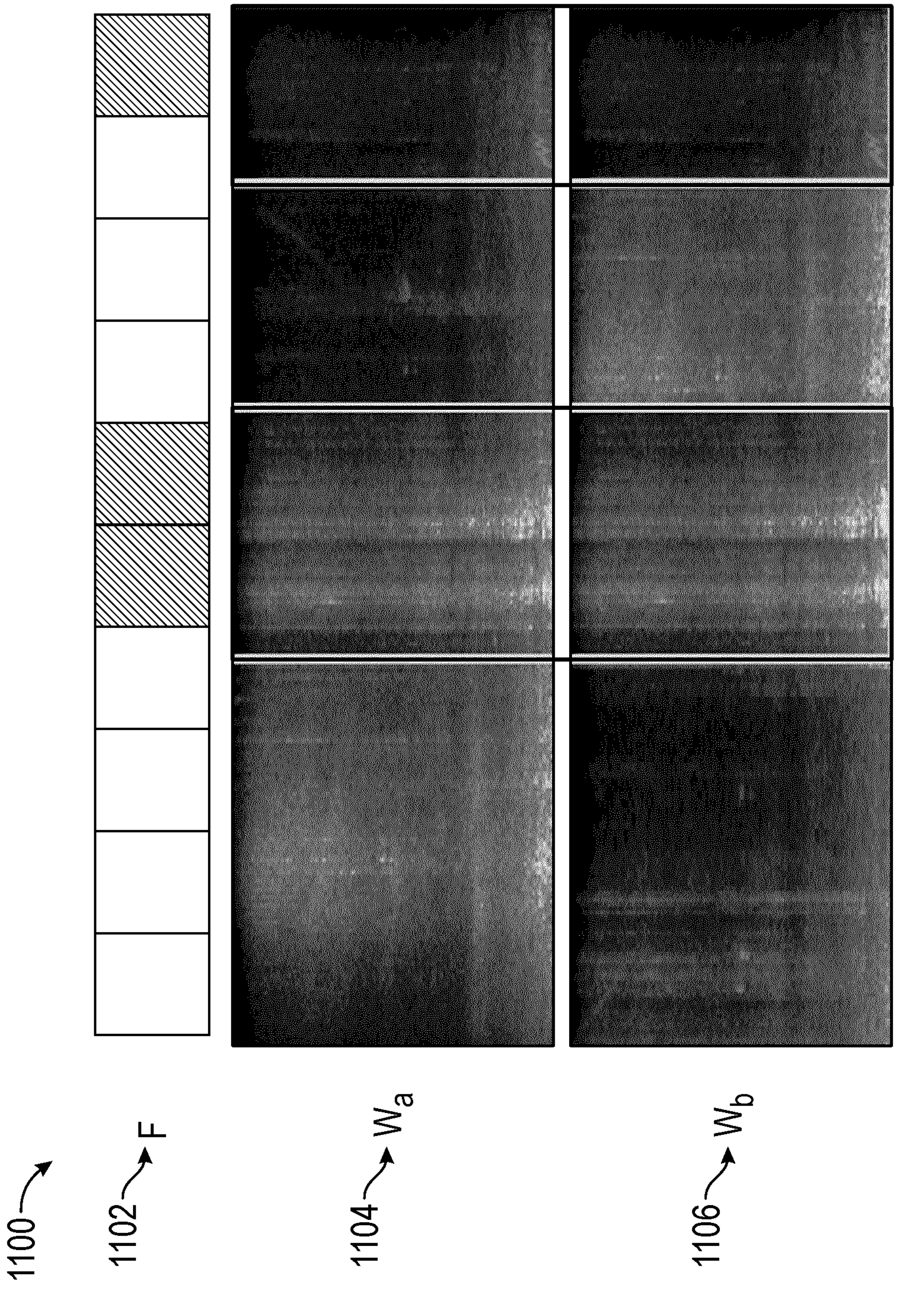
FIG. 11 is a visual representation of spectrogram segments of a first audio signal $w_a$ being compared with the spectrogram units of a second audio signal.

FIG. 11 is a visual representation 1100 of spectrogram segments of a first audio signal $w_b$ being compared with the spectrogram units of a second audio signal. F 1102 shows an example set of timestamped frames.

The first audio $w_a$ signal 1104 may be the audio signal of audio A' in language L'. The second audio signal $w_b$ 1106 may be the audio signal of audio A in language L in the input video V. Each of the spectrogram segments of the second audio signal $w_b$ may have a known viseme and pose that may be obtained from the input video V. The audio signal $w_a$ may be aligned with audio signal $w_b$ to identify the spectrogram segments of second audio signal $w_b$ that are the same as first audio signal $w_a$.

The audio signal $w_a$ may be aligned with audio signal $w_b$ to determine corresponding visemes for spectrogram segments of second audio signal $w_b$. As illustrated in the depiction, certain spectrogram segments of first audio signal $w_a$ may be the same as certain spectrogram segments of second audio signal $w_b$ (green frames shown in FIG. 11). For each common spectrogram segment, the known viseme and pose corresponding to the spectrogram segment of the first audio signal may be retrieved and used to determine the viseme and pose of the spectrogram unit of the second audio signal.

In some embodiments, the frames of video V that match these common spectrogram units may be copied from video V and used in the generation of video V'. For the remaining spectrum segments where there is no commonality, the processes shown in FIG. 12 may be used.

This is an optional step that can be used to bypass certain similar frames to reduce overall computational time. For example, a sample output from this stage could be identified segments requiring frame generation (e.g., identified through timeframes or durations). As an example, these segments could be representative of all of the frames between two time stamps. For example, there may be a video where there is speech between two people from t=5 s to t=6 s. However, it is identified that there are similar frames for certain speech from t=5.00 s-t=5.3 s, and from t=5.5 s-t=6.0 s. Accordingly, the frames from t=5.3 s-t=5.5 s can be inserted into a processing pipeline from generation to generate frame portions that represent the replacement mouth portions for these frames. Each of the frames could be processed using the two trained networks together to replace the mouth portions thereof as described below.

Figure 12:
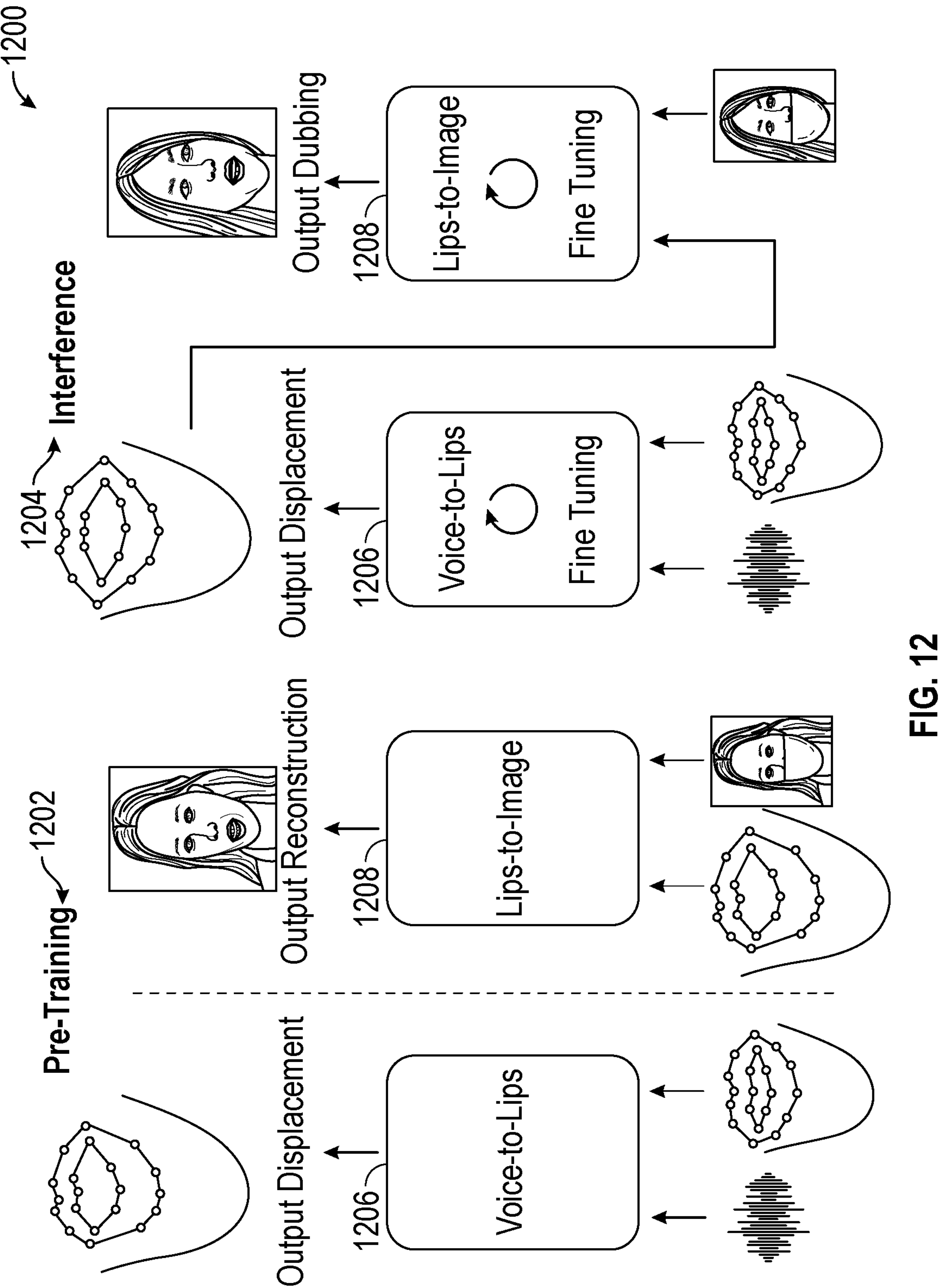
FIG. 12 is a block diagram of a process used to perform lip dubbing.

FIG. 12 is a block diagram 1200 of a process used to perform lip dubbing.

The process may be used in situations where frames cannot be simply copied from the input video V as explained in relation to FIG. 11. As depicted, the process may include a voice-to-lip step and lip to image step. As illustrated in FIG. 18, the process of lip dubbing as described may be performed using system 1800. System 1800 may be part of system 900 and may include a voice-to-lip network and a lip to image network. The voice-to-lip network may be a transformer neural network.

A transformer neural network is a neural network that learns context and thus meaning by tracking relationships in sequential data. The voice-to-lip network may be used to personalize the geometry (through fine tuning) of the lips according to the speaker. The voice-to-lip step may involve receiving the geometry of a lip and animating the lip according to a voice or audio signal.

The lip to image step may involve receiving the personalized geometry of the lips (according to audio) along with every frame that needs to be dubbed. As will be described in further detail below, each frame to be dubbed may first be analyzed to extract existing lip shape for the purpose of masking the lip and chin.

As will be described in further detail below, the lip to image step may then be tasked with "filling" this mask region corresponding to the given lip shapes. Masking is a critical step as without it the network fails to learn anything and simply copies from the input frame.

As shown in FIG. 12, there is a pre-training step 1202 and an inference step 1204.

During the pre-training step 1202, both of the voice-to-lips 1206 and the lips-to-image 1208 models are trained, for example, using identity or identity+shift pairs for various individuals, such that the model interconnections and weights thereof are refined over a set of training iterations. The training can be done for a set of different faces, depending on what is available in the training set.

During the inference step 1204, both of the voice-to-lips 1206 and the lips-to-image 1208 models can be fine-tuned for a particular individual prior to inference for that particular individual.

Voice-to-Lip

Figure 13A:
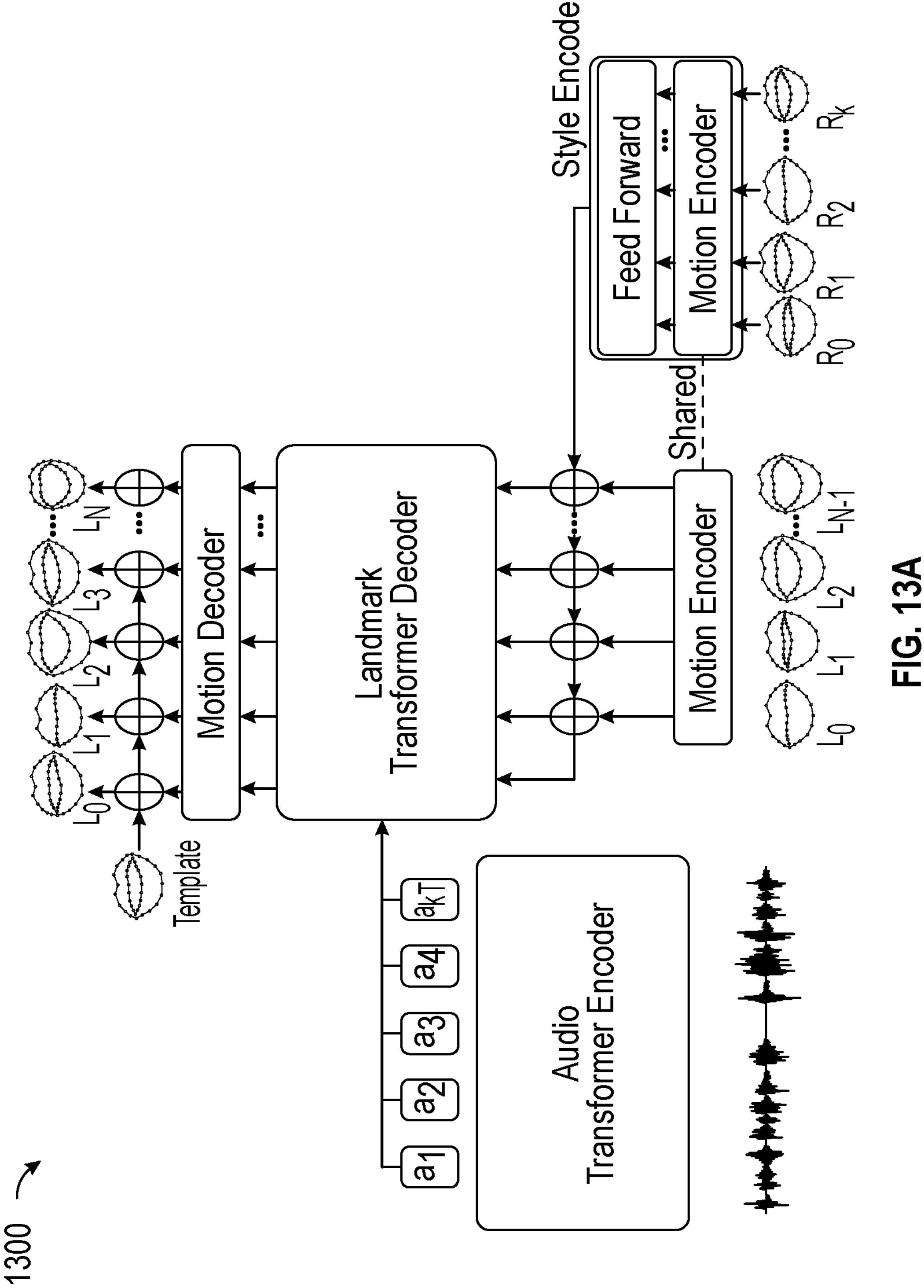
FIG. 13A shows a machine learning topology diagram of an example voice-to-lip network, according to some embodiments.

FIG. 13A shows an example voice-to-lip network 1300, according to some embodiments. The voice-to-lip network may use a transformer-based architecture. The voice-to-lip network may use a transformer-based architecture. The voice-to-lip network may be trained end to end to autoregressively synthesize lip (and chin) landmarks to match input audio. As illustrated, the transformer model may include a TransformerEncoder which encodes input audio into "tokens", along with a TransformerDecoder which attends to the audio tokens and previous lip landmarks to synthesize lip landmark sequences. The transformer encoder matches Wav2Vec2.0™ design and may be initialized with their pretrained weights. Wav2Vec2.0 is a model for self-supervised learning of speech representation.

The Wav2Vec2.0 model is trained on 53,000 hours of audio (CC by 4.0 licensed data) making it a powerful speech encoder. In contrast to the model of FaceFormer™, the present application focuses on explicit generation of lips (as opposed to full face) along with personalization of lips for new identities not in the training set. Faceformer™ is a transformer-based autoregressive model which encodes the long-term audio context and autoregressively predicts a sequence of animated 3D face meshes.

The voice-to-lip model aims to address three problems in prior approaches.

Restrictive data: The most common data sets in voice-to-lip models are BIWI and VOCASET datasets. These datasets consist of audio snippets of multiple identities along with an extremely high precision tracked mesh (i.e., 3D model of face) of the speaker. The problem this introduces is that it is impossible to fine tune the model due to the need of a similar quality mesh of the target identity.

Identity Templates: Additionally, since the BIWI and VOCASET dataset are created in a "clean" (read unrealistic) setting they can supply a template mesh of the identity from which predictions are made. Once again, this restricts the ability to fine-tune for a new identity as acquiring this mesh is not practical.

Lip Style: Finally, FaceFormer, learns the "style" of each speaker through an embedding layer that takes as input a one-hot embedding keyed by the identity of lips and voice in the training set. This choice restricts the model to predict lips according to one of the identities in the training set. Using the lips of another individual to make predictions may provide be problematic since the geometry of an individual's lip is unique.

As described herein, the voice-to-lip model may be trained to predict lip landmarks for an individual based on any video provided having image frames capturing the individual speaking. The benefit of processing videos directly, is that the landmarks extracted for training purposes can be extracted from any video, enabling fine tuning to target footage.

The voice-to-lip model is configured to extract lip landmarks, audio, and an identity template from a reference video corresponding to the individual. The reference video is labelled with the identity of the individual. An identity template may be a 3D mesh of an individual's lips. This data is then smoothed to reduce noise (remove high frequency noise) before being used for training. In some embodiments, the voice-to-lip model may extract 40 landmarks from the lips, along with 21 landmarks that describe the chin line, for a total of 61 landmarks. It should be understood that a different number of facial landmarks (e.g., lip landmarks) could be extracted.

Figure 14:
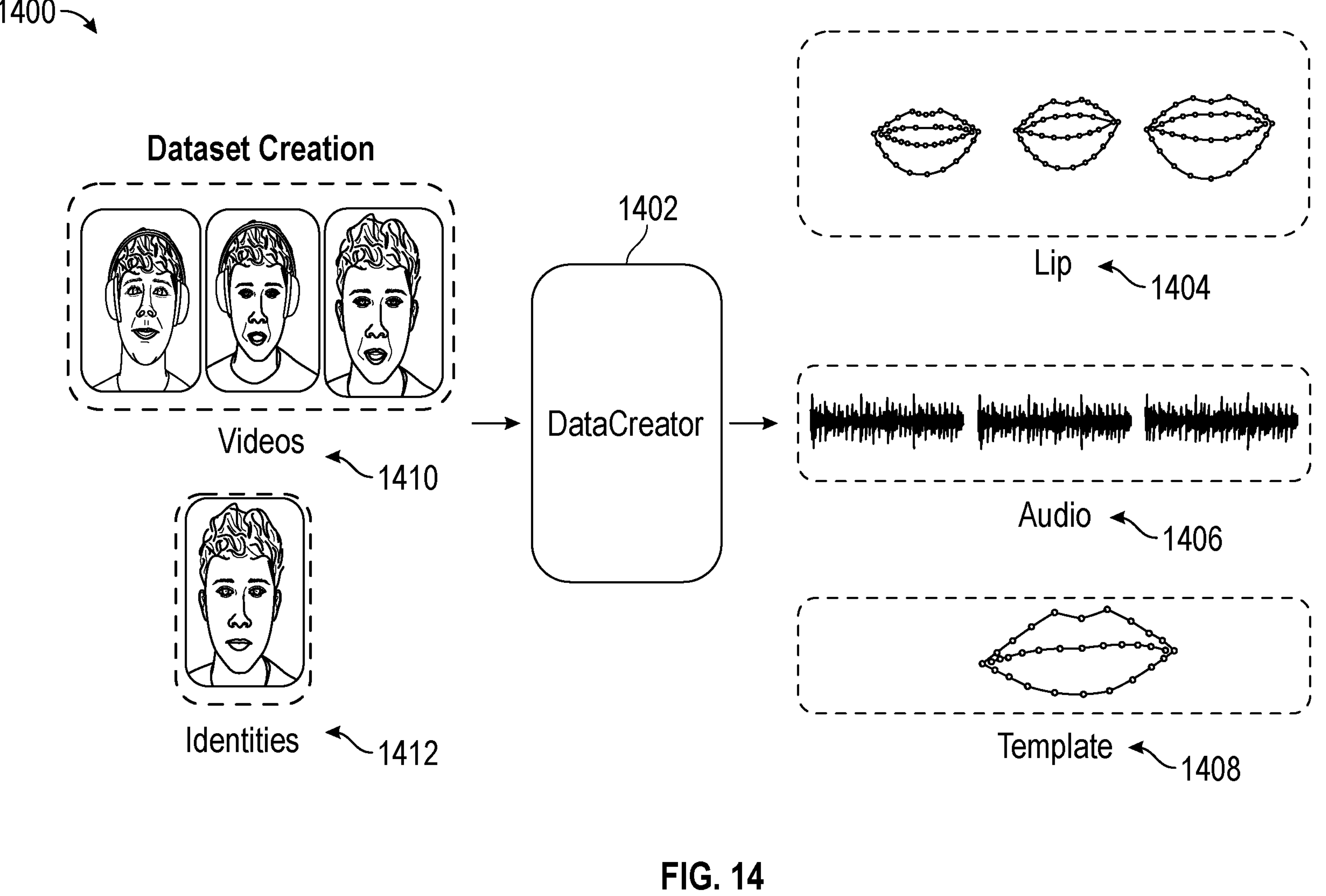
FIG. 14 is a machine learning topology diagram showing a voice-to-lip model configured to extract lip landmarks, audio, and an identity template from a reference video corresponding to an individual, according to some embodiments.

FIG. 14 is a block diagram 1400 showing a voice-to-lip model having a data creator model 1402 configured to extract lip landmarks 1404, audio 1406, and an identity template 1408 from a reference video 1410 corresponding to an individual identity 1412.

An identity template may be a 3D mesh of an individual's lips. The synthesized lip or chip landmark data sets tuned for the individual may be determined based on a deviation from a particular identity template 1408.

Identity templates 1408 may be extracted in multiple ways. For example, identity templates 1412 may be generated based on a "resting" pose image (labelled as "identities" in FIG. 14). This idea of a "resting" pose image closely follows BIWI and VOCASET datasets which provide a similar identity template mesh. However, this approach is limited since a "resting" post image may not be available for new identities. In the present invention, the identity template 1408 for an individual is generated from an average of all extracted landmarks from a reference video corresponding to the individual. Supplying a single identity, created from the average of all extracted lips not only performs better, but removes the problem of deciding which template to predict deltas from.

Finally, as lip style (personalization) is important for the generation process, the present approach attempts to remove the dependence on "one-hot" identity specification present in FaceFormer. Instead of "one-hot" identification which limits the model to generating lips according to styles of identities in the training set, the present invention attempts to learn speaker "style" from a given sequence of lips of the individual. For example, the model may sample a landmark sequence from another dataset example for the given identity. This landmark sequence could then be used to inform speaker style. The idea is that by swapping the sampled sequence for each sample (but ensuring it is from the same identity) the "style embedding" layer will be able to adapt to new identities at test time.

Figure 13B:
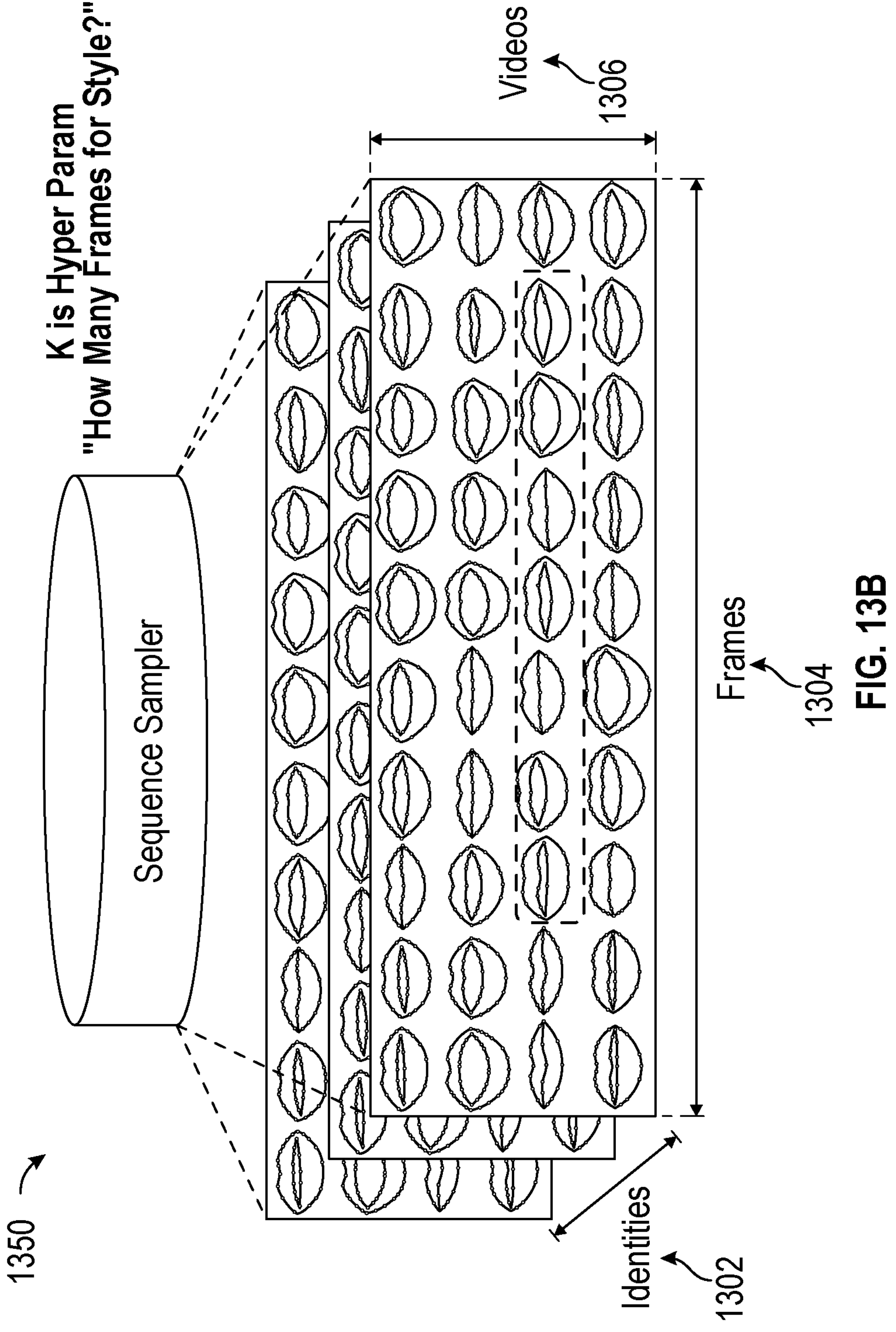
FIG. 13B shows an example sequence sampler, according to some embodiments.

FIG. 13B shows an example sequence sampler 1350, according to some embodiments. The sequence sampler may include a plurality of mouth shapes based on identities 1302, frames 1304, and videos 1306.

The voice-to-lip model map be fine tuned for a new identity by extracting lip landmarks and voice from the original video and specifically tuning the "style encoder" for the new target identity. Once fine tuned, the voice-to-lip model can generate lips from arbitrary audio in the style of the target identity.

Lips to Image Network

Figure 15A:
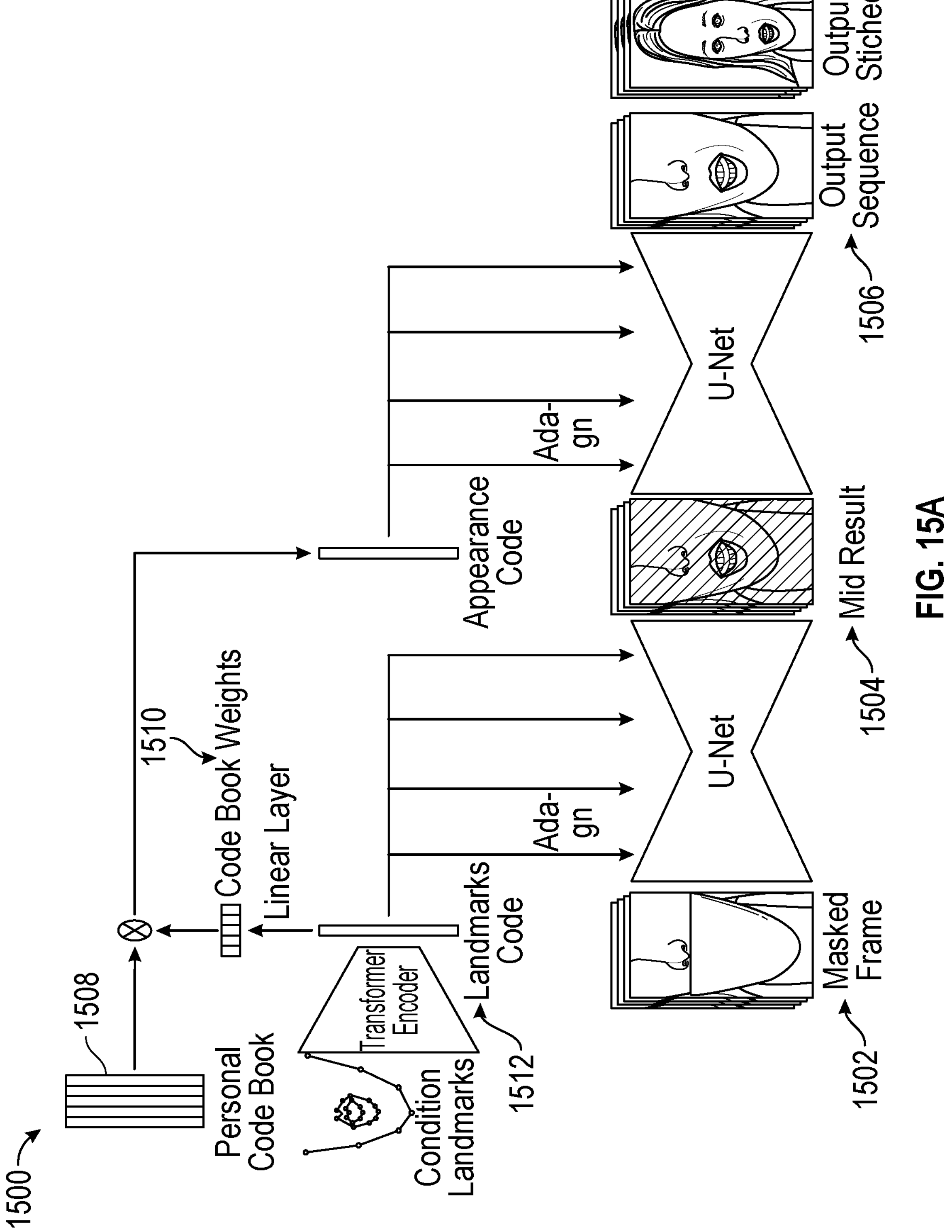
FIG. 15A is an example lip-to-image network, according to some embodiments.

FIG. 15A is an example lip-to-image network 1500, according to some embodiments.

As depicted, the lip-to-image network 1500 includes a first stage and a second stage. In the first stage of the network, a masked frame 1502 and a landmarks code 1512 (see explanation below) that is learned from the lips and jaw geometry is received to produce a rough estimation or a mid result 1504 of the reconstructed frame. The reconstructed frame may miss certain details. In the second stage of the network, an appearance code and the mid result 1504 from the previous stage is received to produce a detailed reconstruction as an output sequence 1506. The detailed reconstruction may include details that were previously missed in the mid result 1504.

The lip-to-image network 1500 may include a transformer encoder to encode the lip geometry of the target lip and jaw landmarks. This encoding of the target geometry is referred to as the "landmark code" 1512. As depicted, the landmark code 1512 may be passed to both the personal codebook 1508 and the first stage of the network via adaptive group-wise normalization layers. Note that the appearance code may be learned according to the ID. To obtain the appearance code, a personalized code book 1508 may be learned for each identity. Then a set of coefficients or weights 1510 may be estimated according to the landmarks code that are multiplied into feature vectors of the codebook to produce the final appearance code.

For both stages, UNET network with a similar structure to DDPM may be used.

In order to make the lip geometry and texture believable, the network 1500 may first be trained on an initial dataset of various speakers and later fine-tuned to target a video of a single actor speaking. This fine-tuning process biases the network 1500 into generating lip geometry and textures that are specific to the target actor being dubbed. Note that the personal codebook may be first learned on the whole dataset and then fine-tuned for an identity.

Figure 16:
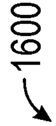
FIG. 16 is an illustrative diagram showing two images that define an inpainting area.
Figure 16:
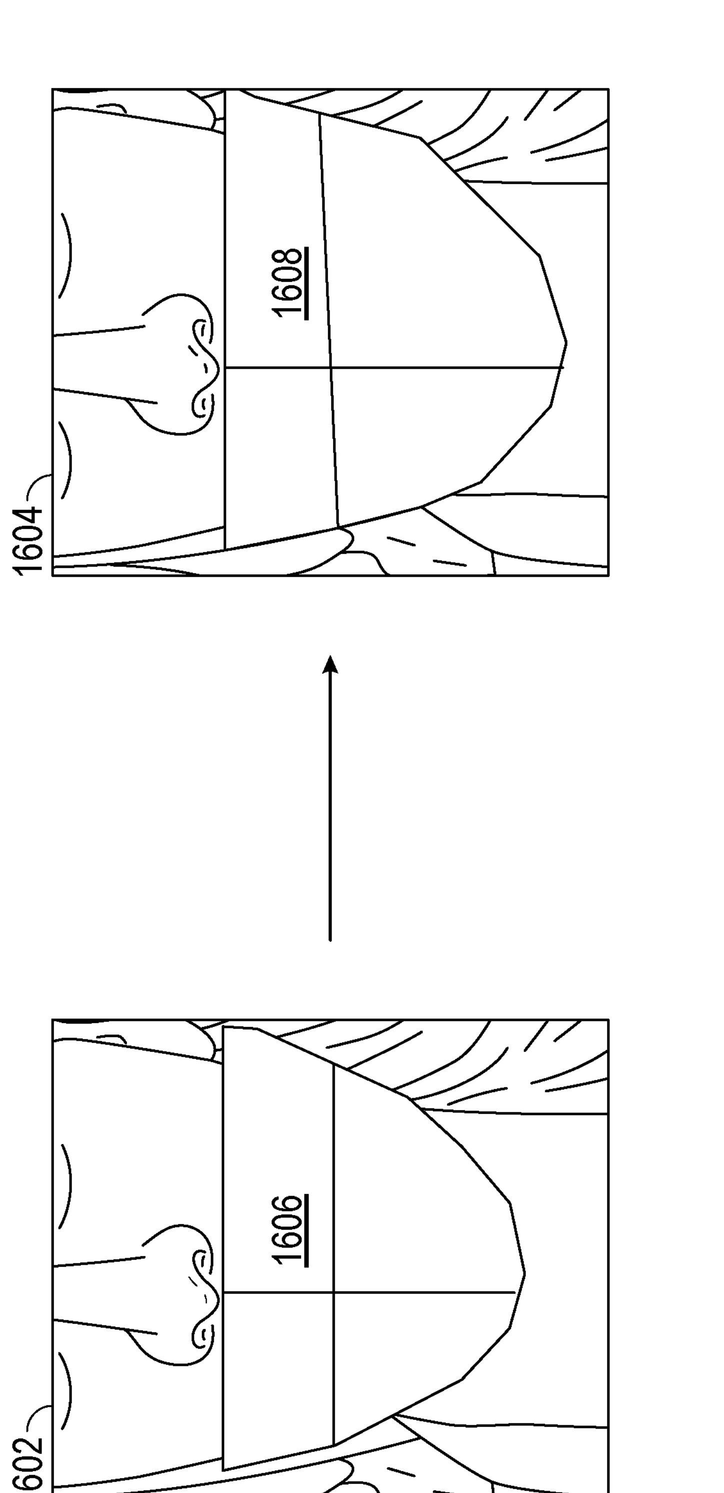

In some cases, the lips in the input frame may be sealed and the lips in the output frame may be opened. In some cases, the lips in the input frame are open and the lips in the output are closed. As shown in FIG. 16, a process 1600 is implemented by the system to address these situations, the input frame 1602 may be masked by a masking region 1606 according to the maximum area that the jaw covers to reduce potential texture artifacts in the detailed reconstructed frame 1604. The masked frame may define an in-painting area 1608 for generation of at least one of the rough reconstructed frame (i.e., mid result) and the detailed reconstructed frame. This is critical since otherwise, double chins or some artifacts in the texture may appear.

The lip-to-image network 1500 may utilizes various losses. A number of example losses are described below, for example, using a first, a second, a third loss, and/or a fourth loss that can be used together in various combinations to establish an overall loss function for optimization.

The first loss may be a mean squared error loss for measuring the squared difference in pixel values between the ground truth and output image of the network 1500. The second loss may be a Learned Perceptual Image Patch Similarity (LPIPS) loss that measures the difference between patches in the ground truth image versus the output image of the network 1500. The third loss may be a "height-width" loss which measures the difference between openness of the lips between ground truth and network output. The neural network may be used as a differentiable module to detect landmarks on the lips of the output as well as the ground truth and compare the differences in lip landmarks (i.e., fourth loss). Lastly, a lip sync expert discriminator to correct the synchronization between the audio and the output.

The lip-to-image network works directly on a generator network, such as but not limited to StyleGAN. The approach learn a set of codes that represent visemes and then according to each lip shape, the network produces a set of coefficient that if multiplied into the codes, any lip shape is produced.

This expressiveness is such that for a given point in the latent space representing a face, moving along a certain direction results in local, meaningful edits of the face. E.g., moving in one direction might make a black hair blonde, and moving in another direction might change the lips to smiling.

The problem that the approach aims to solve is finding directions in the generator (e.g., StyleGAN) latent space that represent different lip movements of a person while talking. Applicants approach this problem by realizing that human lip movements can roughly be categorized in a limited number of groups that, if learned, can be combined to create any arbitrary lip shape.

Figure 15B:
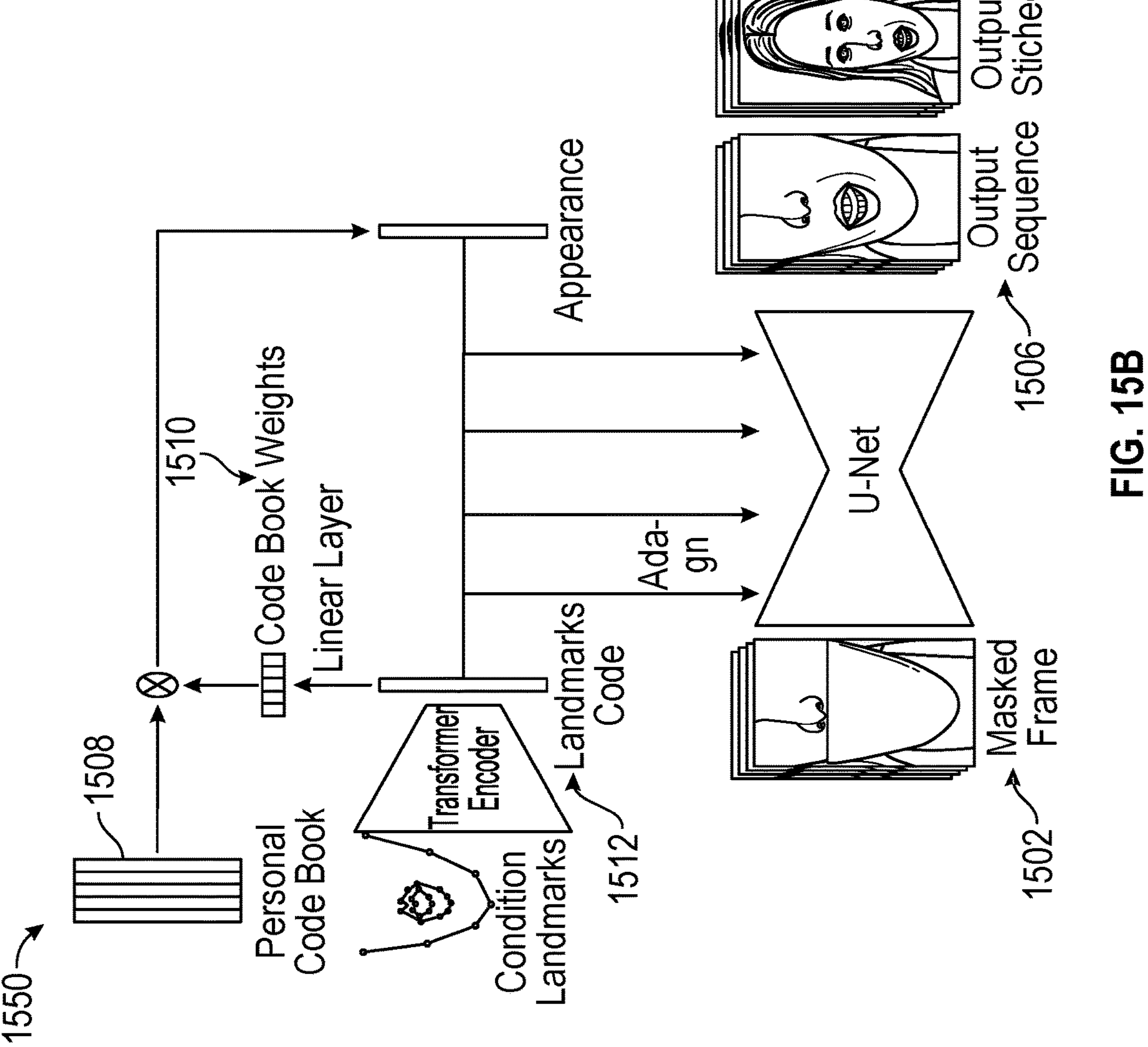
FIG. 15B is an example lip-to-image network, according to some embodiments.

In some embodiments, a system may include a machine learning architecture that has just a single UNET network. FIG. 15B is another example lip-to-image network 1550, according to some embodiments.

As depicted, the lip-to-image network 1550 includes just a single UNET network. A masked frame 1502, a landmarks code 1512 learned from the lips and jaw geometry, and optionally, an appearance code are received and processed by the UNET network model to produce the final reconstructed frame 1506, skipping the mid-results in FIG. 15A. In some embodiments, the appearance code is not used to generate the output sequence 1506.

The lip-to-image network 1550 may include a transformer encoder to encode the lip geometry of the target lip and jaw landmarks. This encoding of the target geometry is referred to as the "landmark code" 1512. As depicted, the landmark code 1512 may be passed to both the personal codebook 1508 and the network via adaptive group-wise normalization layers. Note that the appearance code may be learned according to the ID. To obtain the appearance code, a personalized code book 1508 may be learned for each identity. Then a set of coefficients or weights 1510 may be estimated according to the landmarks code that are multiplied into feature vectors of the codebook to produce the final appearance code.

Figure 17:
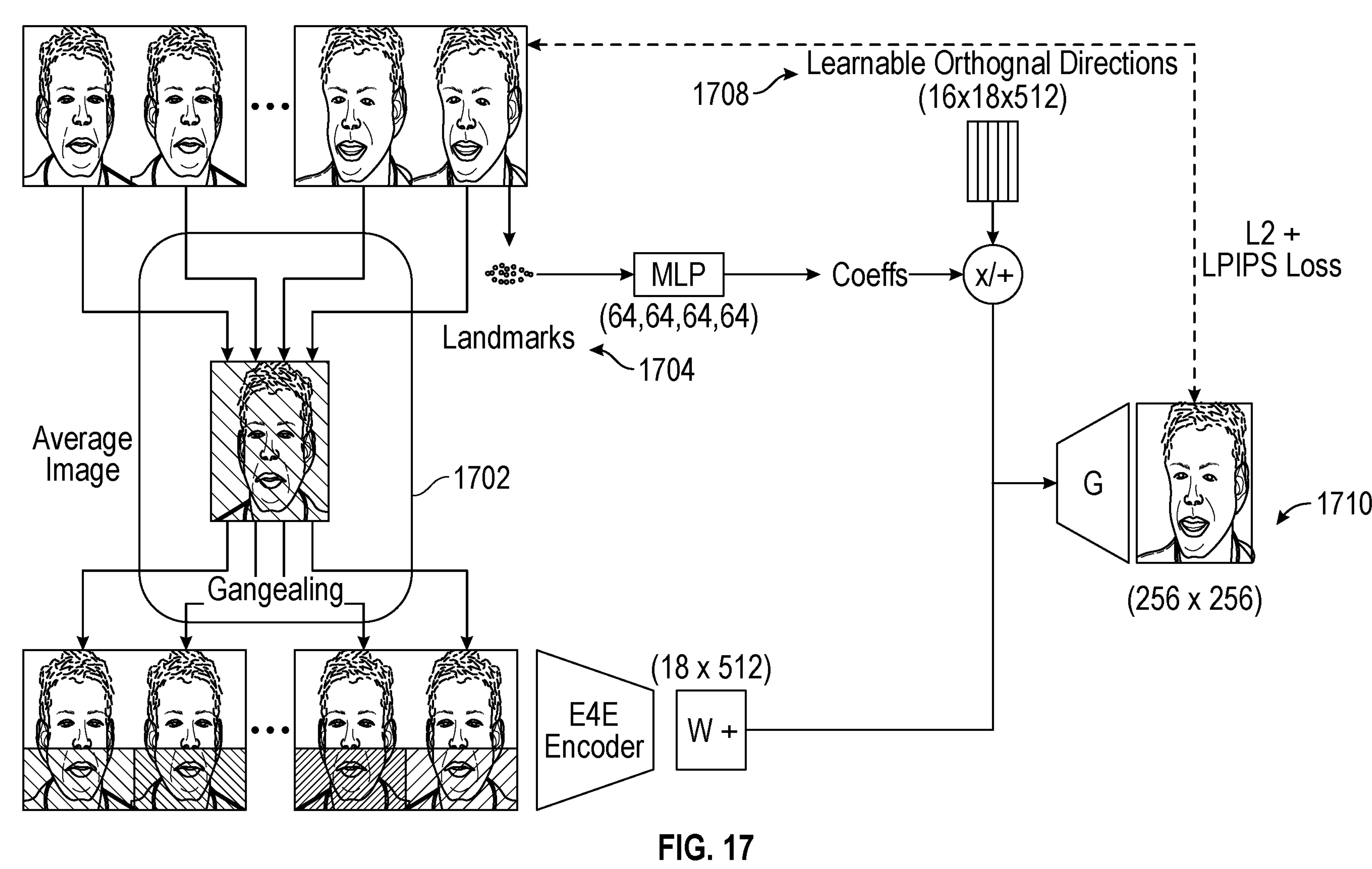
FIG. 17 is an example flow diagram showing face generation, according to some embodiments.

FIG. 17 shows an example architecture 1700 of a model, showing a number of steps for face generation.

In the first step, the system changes the lip shapes of each frame of the given video to a canonical lip shape and encodes the image to the StyleGAN latent space using E4E. The canonicalization of the lip shapes can be done in several ways. One method is to mask the lower region of the face similar to the UNet approach and train an encoder from scratch to learn the canonical lip shapes. Another approach is to apply Gangealing process 1702 to every frame, take the average of the frames in the congealed space and paste the lower part of the average image back into every frame. The benefits of this method compared to the masking method are that one can avoid training the encoder from scratch by using a pretrained E4E encoder, and the details of the lower face region would not be missed due to masking.

In the second step, the system is adapted to learn the editing direction, which changes the canonical lip shape to an arbitrary lip shape represented by a set of lip landmarks 1704. This is done by representing different lip movements with a linear combination of a set of learnable orthogonal directions 1708 in the StyleGAN space. Each of these directions should represent a change from the canonical lip shape to a viseme, and a combination of these visemes can be used to generate any arbitrary lip shape. Applicants frame the problem of learning these directions as a reconstruction problem where the network directly optimizes the directions by learning to change the canonical lip shape of each frame to the correct lip shape during training.

More precisely, Applicants first extract the landmarks 1704 from the face in a given frame and pass it through an MLP to determine the coefficients of the linear combination. Then, the system orthogonalizes the directions using the Gram-Schmidt method and compute the linear combination. Finally, the system add the combination to the canonical latent code given by the E4E encoder.

In the final step, the system passes the resulting latent code from the previous step, to the pretrained StyleGAN generator and output an image 1710. The training process is supervised by $L_2$ and LPIPS loss between the output of the generator and the given frame.

For performing lip dubbing on a given video, instead of extracting the lip landmarks from the frames, in this embodiment, the system can get the stream of lip landmarks from the Voice2Lip network and pass them into the framework.

Figure 18B:
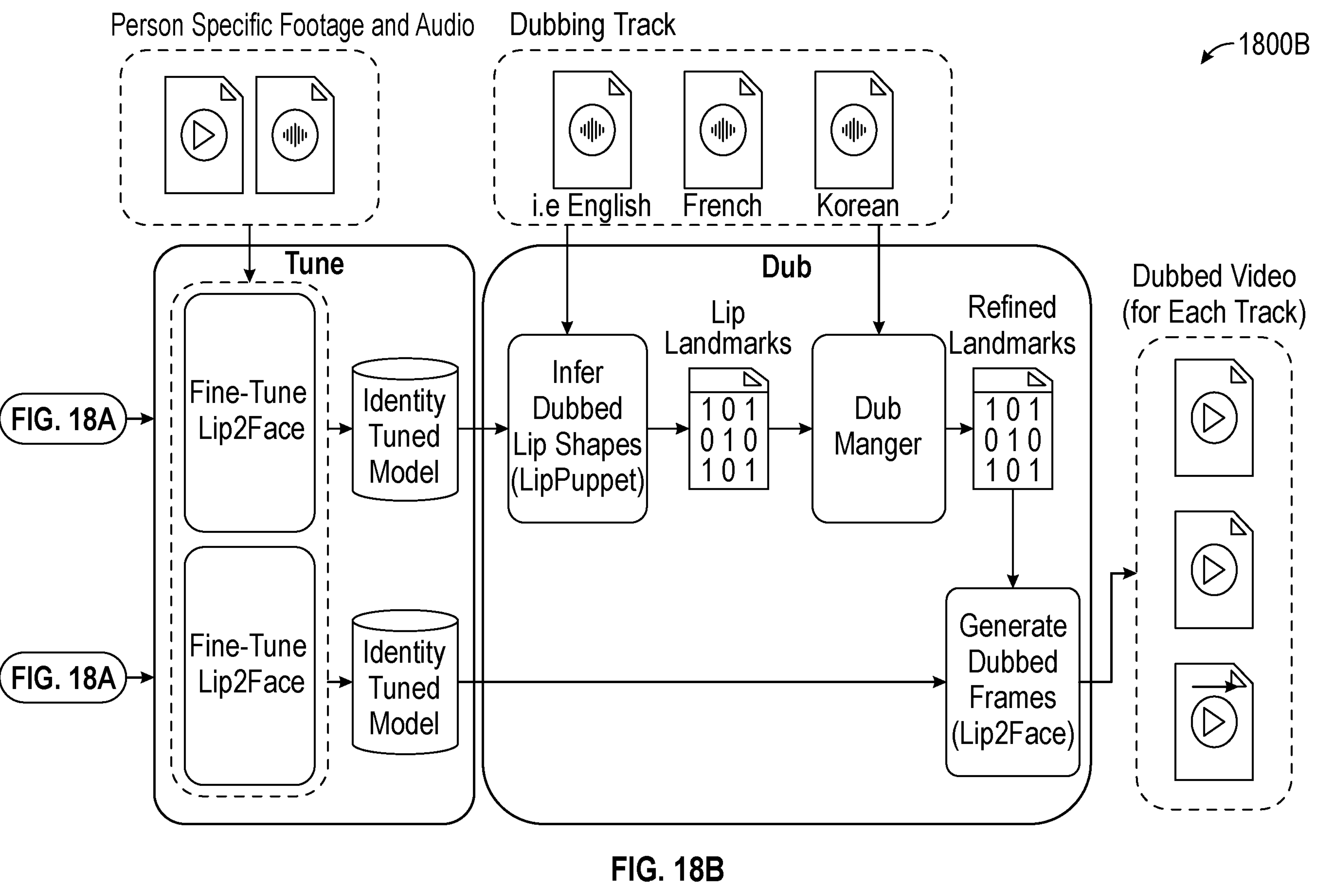

FIG. 18A and FIG. 18B are a process flow diagram (including sub-process 1800A and sub-process 1800B) mapped across two pages that show an approach for utilizing the machine learning approach for generating output video, according to some embodiments.

In FIG. 18A, a process 1800A is shown to illustrate how training and fine tune the autoregressive model for inferring lip shapes from audio.

Initial LipFormer Flow and Method Steps

The sub-process 1800A starts with training data, and in this approach, an example is described in relation to a system for forming lips (e.g., LipFormer). The training data for LipFormer can be video recordings in which there is a single speaker in view, speaking into the camera. This data can be collected by recording internal employees speaking predefined sentences that target a range of visemes (lip shapes).

Once this data is collected, the system can start the lip former pre-processing process. For each video in the data set the flow can include:

1. Detect face and landmarks for each frame in video
2. Project 2D pixel space landmarks to canonical 3D using Procrustes analysis
   a. Canonical representation moves all landmarks to common space, unaffected by positon of face in image
3. Extract audio from video
4. Write audio, landmarks, and identity to dataset for training
   a. Identity is tagged on videos for simplicity A machine learning model, LipPuppet, is trained to generate lip landmarks, given only audio and an identity. The system can train LipPuppet on a "global" data pool, and then in sub-process 1800B, fine tune the model on any new identities. Without fine-tuning, the global model can produce lip shapes that match any of the training identities, but will not capture the details of a specific unseen identity.

LipPuppet can be used directly without finetuning, but the lips will not capture intricacies of each unique identity. If data is available for fine tuning, LipPuppet can be tuned to the identity of interest using the following flow.

1. Process given identity footage according to "Data and Preprocessing"
2. Load global LipPuppet model
3. Initialize "style" embedding to be learnt
4. Optimize "style" embedding layer, freezing (or not) other LipPuppet layers
5. Fine tune to training data until converged The goal of fine tuning is to learn the "style" of an arbitrary speaker that was not within the training set.

Once fine tuned, the inference flow can include:

1. Load identity specific (or global) LipPuppet model
2. Chunk audio segment into segments of length N ms (LipPuppet has a max sequence length)
3. Overlap audio segments by K ms
4. Forward pass on each segment
5. Concatenate generated lip landmarks, averaging in regions of overlap The lip landmarks can now be used for lip2face. Note that not discussed here is the "Dub Manager", which can be configured to apply filtering on the lip landmarks before passing to lip2face. This filtering is to help with transitions between silences in dubbing tracks and moments in which the lip shapes match between source and dubbing.

Initial Lip2Face flow and method steps are described in relation to how the system trains and fine tune the model for infilling lip texture given a lip shape and masked input frame. Lip2Face data requirements are similar to LipFormer except that no audio is required. Lip2Face may require original frames along with their extracted landmarks.

1. Detect face and 2D landmarks for each frame in video
2. Crop and rotate image to the face
   a. Rotation keeps eyes in common locations
3. Generate mask that obscures the mouth region
   a. Can be from nose tip down, or a contour along the chin
   b. Can also include the nose region, and extending to cover the mouth region
4. Write out images, crops, masks, and landmarks In some embodiments, masking from nose tip down (i.e., excluding nose) can enable information smuggling during training, causing the machine learning model to over-attend to laugh lines or cheeks in the input frames. Therefore, maskings that include additional region, such as a masking that includes the nose region, may bring technical and drastic improvement to the results.

The presence of certain facial expressions, such as laugh lines, limits the flexibility of the machine learning model in positioning the lips on the face. This is because the laugh lines are also taken into account (i.e., interpolated) when generating new lip shapes suggested by the neural network of the machine learning model. As a result, the network needs to, during training, balance both the desired lip shape (suggested by the lip geometry condition) and the constraints imposed by the laugh lines present in the input video.

For example, a person in an input video may have laugh lines. In reality, one person cannot make an "ooo" mouth shape while also having laugh lines. During training, the machine learning model may inadvertently receive hints on lip shape from information hidden in laugh lines, leading to information smuggling. This can cause the model to over-focus on laugh lines or cheeks during inference, leading to inaccurate lip shape predictions. Therefore, masking one or more regions of a face that have high correlation to the lip shape leads to improved machine learning model performance.

In some embodiment, input images are only used for texture, while the lip landmarks are only used for mouth shape.

Lip2Face is trained to "in fill" a given masked input image using given lip landmarks for that frame and, optionally, an identity. The system trains Lip2Face on a "global" data pool, then can fine tune it on specific identities to capture better textures. In another embodiment, the model could be used without finetuning, but if data is available, fine tuning will improve the results.

Fine Tuning

As noted above, Lip2Face can be used directly without fine tuning but the textures of generated lips may not be high quality. If data is available, Lip2Face can be fine tuned using the following flow.

1. Process given identity footage according to "Data and Preprocessing"
2. Load global Lip2Face model
3. Initialize "style" embedding
4. Optimize "style" embedding, freezing other lip2face layers (or not)
5. Fine tune to training data until converged
6. The goal of fine tuning lip2face is to learn a "style" embedding that represents this new unseen identity.

The inference process for Lip2Face can use landmarks generated by LipPuppet. Lip2Face can also use landmarks extracted directly from video footage, which simplifies the flow. The following process is used to create new dubbed frames from lip landmarks.

1. Process video to be dubbed according to "Data and Preprocessing"
2. Load driving lip landmarks generated by LipPuppet
3. Align driving landmarks to extracted "source" lips using source lip transform from pixel to canonical space
4. (Optional) Least squares lip personalization of lip landmarks to match source
   a. Can be used if LipPuppet fine tuning was not performed or was not successful 5. Forward pass on each masked source frame, replacing landmarks with the loaded and aligned driving landmarks
6. Create video from inference results adding dubbing audio as the track.

At the end of this process, an output is dubbed videos. A "Dub Manager" process can be used again here, to replace frames that are not required (for example, when there is character laughing, or dub and original being silent, these frames can be removed).

Figure 19:
FIG. 19 is an example block schematic of components of a system for conducting lip dubbing, according to some examples.
Figure 19:
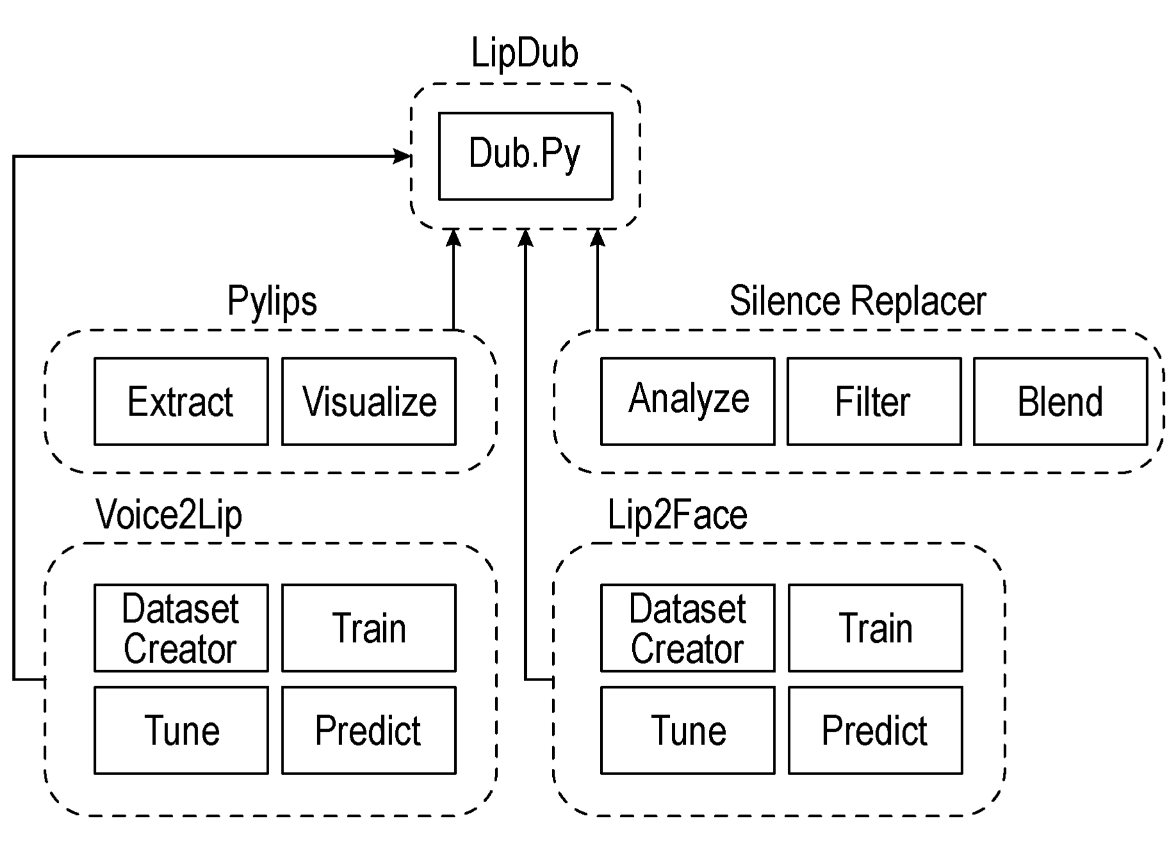

FIG. 19 is an example block schematic diagram 1900 of components of a system for conducting lip dubbing, according to some examples. In block schematic diagram 1900, a set of computational processes are shown including different machine learning models and programmatic code execution blocks that can be implemented in the form of a modular computer program stored on non-transitory computer readable memories.

Figure 20:
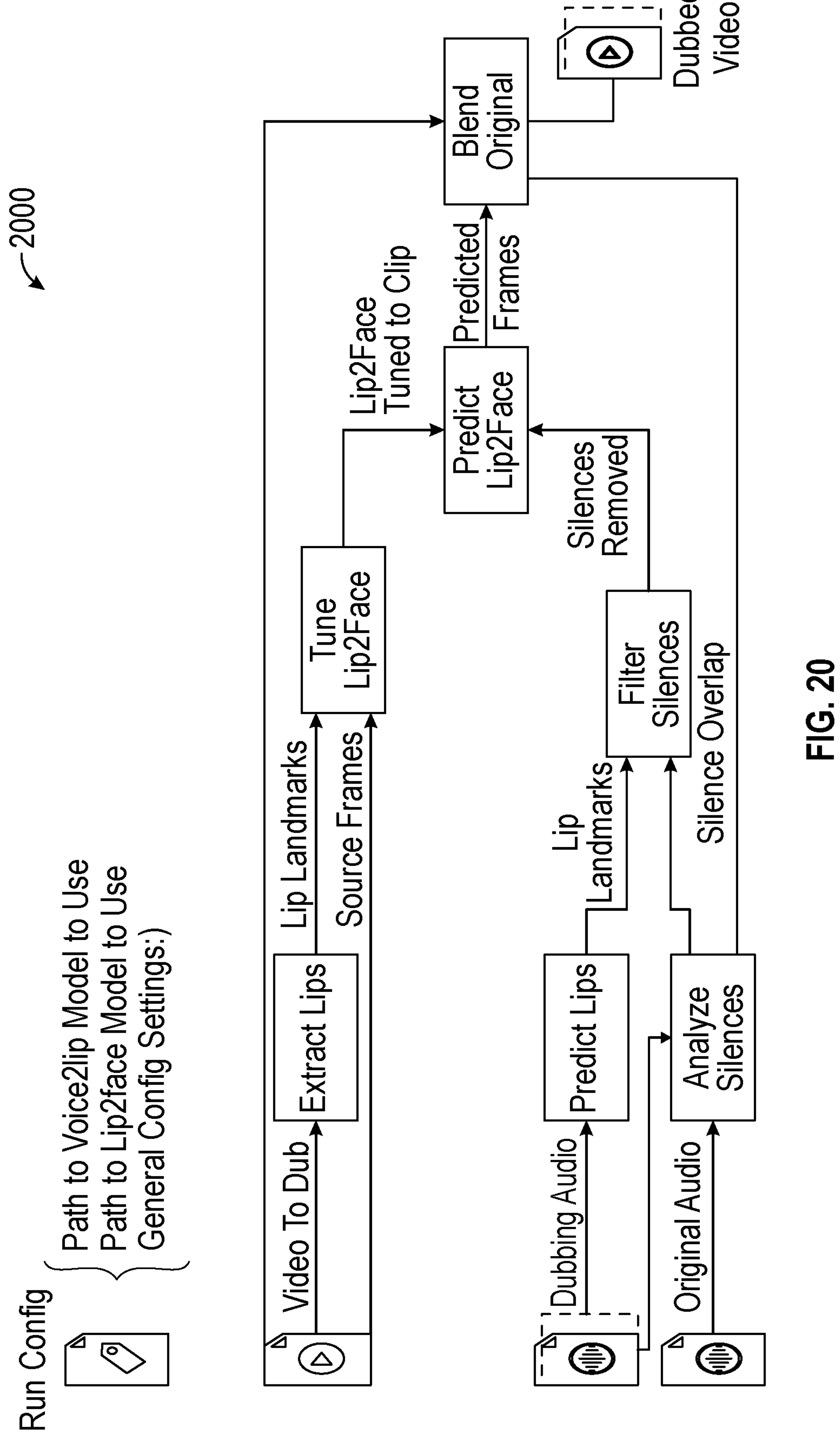
FIG. 20 shows an example computational process flow that can be used in a commercial practical implementation as part of a processing pipeline.

FIG. 20 shows an example computational process flow 2000 that can be used in a commercial practical implementation as part of a processing pipeline. In FIG. 20, the diagram shows steps that can be conducted in parallel and serially such that computational inputs are received, models are trained, and the trained models are deployed to automatically generate outputs in accordance with various embodiments described herein.

The system can be implemented as a special purpose machine, such as a dedicated computing appliance that can operate as part of or as a computer server. For example, a rack mounted appliance that can be utilized in a data center for the specific purpose of receiving input videos on a message bus as part of a processing pipeline to create output videos. The special purpose machine is used as part of a post-production computing approach to visual effects, where, for example, editing is conducted after an initial material is produced. The editing can include integration of computer graphic elements overlaid or introduced to replace portions of live-action footage or animations, and this editing can be computationally intense.

The special purpose machine can be instructed in accordance to machine-interpretable instruction sets, which cause a processor to perform steps of a computer implemented method. The machine-interpretable instruction sets can be affixed to physical non-transitory computer readable media as articles of manufacture, such as tangible, physical storage media such as compact disks, solid state drives, etc., which can be provided to a computer server or computing device to be loaded or to execute various programs.

In the context of the present disclosed approaches, the pipeline receives inputs for post-processing, which can include video data objects and a target audio data object. The system is configured to generate a new output video data object that effectively replaces certain regions, such as regions of the mouth regions. The target audio data object can be first decomposed to time-stamped audio tokens, which are mapped to phonemes and then corresponding visemes. Effectively, each time-stamped audio token can represent a mouth shape or a mouth movement that corresponds to the target audio data object.

As the original video has speech in an original language, the mouth and/or facial motions of the individual need to be adapted in the output video in an automated attempt to match the target audio data object (e.g., the target language track). As described herein, this process is difficult and impractical to conduct manually, and proposed herein are machine learning approaches that attempt to automate the generation of replacement video.

A first example of a special purpose machine can include a server that is configured to generate replacement output video objects based on parameter instruction sets that are disentangle expression and pose when controlling the operation of the machine learning network. For example, the parameter instruction sets can be based on specific visemes that correspond to a new mouth movement at a particular point in time that correspond to the target mouth movement in the target language of the desired output audio of the output video object. Optionally, the parameter instruction sets can be extended with additional parameters representing residual parameters.

In this example, the machine learning network has two sub-networks, a first sub network being a voice to lips machine learning model, and a second sub network being a lips to image machine learning model. These two models interoperate together in this example to reconstruct the frames to establish the new output video data object. The two models can be used together in a rough/fine reconstruction process, where an initial rough frame can be refined to establish a fine frame. In the reconstruction process, the models work together in relation to masked frames where inpainting can occur whereby specific parts of image frames are replaced, just in regions according to the masked frames (e.g., just over the mask portion).

The output, in some embodiments, can be instructions for inpainting that can be provided to a downstream system, or in further embodiments, replacement regions for the mask portions or entire replaced frames, depending on the configuration of the system. The pipeline computing components can receive the replacement output video or replacement frames, and in a further embodiment, these frames or video portions thereof can be assessed for quality control, for example, by indicating that the frames or video portions are approved/not approved. If a frame/video portion is not approved, in a further embodiment, the system can be configured to re-generate that specific portion and the disapproval can be utilized as further training for the system. In some embodiments, an iterative process can be conducted until there are no disapproved sections and the all portions or frames have passed the quality control process before a final output video data object is provided to a next step in the post-processing pipeline.

The post-processing pipeline can have multiple processors or systems operating in parallel. For example, a video may be received that is a video in an original language, such as French. Audio tracks may be desired in Spanish, English, German, Korean, Chinese, Japanese, Malaysian, Indonesian, Swahili, etc. Each of these target audio tracks can be obtained, for example, by local voice talent, computer voice synthesis using translation programs, etc. The system can be tasked in post-production to create a number of videos in parallel where the mouths are modified to match each of these target audio tracks. Each generated video can then undergo the quality control process until a reviewer (e.g., a reviewer system or a human reviewer) is satisfied with the output.

Variations of computing architecture are proposed herein. For example, in an exemplar embodiment, a single U-net is utilized that exhibits strong performance in experimental analysis.

Variations of masking approaches are also proposed, for example, an improved mask that extends the mask region into the nose region instead of just below the nose, which was also found to exhibit strong performance in experimental analysis.

Applicant notes that the described embodiments and examples are illustrative and non-limiting. Practical implementation of the features may incorporate a combination of some or all of the aspects, and features described herein should not be taken as indications of future or existing product plans.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended embodiments are intended to include within their scope such processes, machines, manufacture, compositions of matter, means, methods, or steps.

As can be understood, the examples described above and illustrated are intended to be exemplary only.

The invention claimed is:

1. A computer-implemented system for generating an output video for lip dubbing, the system comprising:

a processor;

a memory coupled to the processor and storing processor-executable instructions that, when executed, configure the processor to:

receive an initial video data object V comprising a plurality of image frame data objects I;

extract, from an initial audio data object A corresponding to initial video data object V, an initial set of expression/viseme codes corresponding to spectrogram segments in the initial audio data object A;

receive a set of time-synchronized viseme parameters corresponding to target audio data object A'; and process the initial video data object V and the set of time-synchronized viseme parameters using a machine learning network to generate an output video data object V', wherein initial mouth regions in the initial video data object V have been replaced with replacement mouth regions generated based on the set of time-synchronized viseme parameters;

wherein the initial video data object V is utilized to populate a viseme library of available visemes based on the initial set of expression/viseme codes; and wherein the processor is configured to compare visemes identified in the target audio data object A' to the viseme library of available visemes based on the initial set of expression/viseme codes to identify a subset of visemes not in the viseme library and requiring synthesis.

2. The system of claim 1, wherein the set of time-synchronized viseme parameters corresponding to the target audio data object A' are a set of parameters identified using a plurality of encoder networks adapted to disentangle expression e and pose p from a plurality of image properties.

3. The system of claim 2, wherein the plurality of encoder networks are iteratively trained to disentangle the expression parameters e, the pose parameters p and residual parameters r from the plurality of image frame data objects I.

4. The system of claim 1, wherein the subset of visemes not in the viseme library are synthesized from visemes obtained from other work from a same actor.

5. The system of claim 1, wherein the subset of visemes not in the viseme library are synthesized from an eigenface.

6. The system of claim 5, wherein the processor is configured to generate new expression/viseme codes corresponding to the subset of visemes not in the viseme library.

7. The system of claim 1, wherein the processor is configured to generate the output video data object V' by replacing at least one from the plurality of image frame data objects I in its entirety with a replacement image frame data object I'.

8. The system of claim 1, wherein the processor is configured to generate the output video data object V' by replacing a portion of at least one from the plurality of image frame data objects I with a corresponding portion of a replacement image frame data object I', wherein the portion corresponds to a mouth region.

9. The system of claim 1, wherein the processor is configured to generate the output video data object V' iteratively for each character present in the initial video data object V.

10. The system of claim 1, wherein the machine learning network comprise a generative adversarial network.

11. A computer-generated method for generating output video, the method comprising:

receiving an initial video data object V comprising a plurality of image frame data objects I;

extracting, from an initial audio data object A corresponding to initial video data object V, an initial set of expression/viseme codes corresponding to spectrogram segments in the initial audio data object A;

receiving a set of time-synchronized viseme parameters corresponding to target audio data object A'; and processing the initial video data object V and the set of time-synchronized viseme parameters using a machine learning network to generate an output video data object V', wherein initial mouth regions in the initial video data object V have been replaced with replacement mouth regions generated based on the set of time-synchronized viseme parameters;

wherein the initial video data object V is utilized to populate a viseme library of available visemes based on the initial set of expression/viseme codes; and wherein the method further comprises comparing visemes identified in the target audio data object A' to the viseme library of available visemes based on the initial set of expression/viseme codes to identify a subset of visemes not in the viseme library and requiring synthesis.

12. The method of claim 11, wherein the set of time-synchronized viseme parameters corresponding to the target audio data object A' are a set of parameters identified using a plurality of encoder networks adapted to disentangle expression e and pose p from a plurality of image properties.

13. The method of claim 12, wherein the plurality of encoder networks are iteratively trained to disentangle the expression parameters e, the pose parameters p and residual parameters r from the plurality of image frame data objects I.

14. The method of claim 11, wherein the subset of visemes not in the viseme library are synthesized from visemes obtained from other work from a same actor.

15. The method of claim 11, wherein the subset of visemes not in the viseme library are synthesized from an eigenface.

16. The method of claim 11, further comprising generating the output video data object V' by replacing at least one from the plurality of image frame data objects I in its entirety with a replacement image frame data object I'.

17. The method of claim 11, further comprising generating the output video data object V' by replacing a portion of at least one from the plurality of image frame data objects I with a corresponding portion of a replacement image frame data object I', wherein the portion corresponds to a mouth region.

18. The method of claim 11, further comprising generating the output video data object V' iteratively for each character present in the initial video data object V.

19. A non-transitory computer readable medium, storing machine interpretable instruction sets, which, when executed by a processor, cause the processor to perform the steps of:

receiving an initial video data object V comprising a plurality of image frame data objects I;

extracting, from an initial audio data object A corresponding to initial video data object V, an initial set of expression/viseme codes corresponding to spectrogram segments in the initial audio data object A;

receiving a set of time-synchronized viseme parameters corresponding to target audio data object A'; and processing the initial video data object V and the set of time-synchronized viseme parameters using a machine learning network to generate an output video data object V', wherein initial mouth regions in the initial video data object V have been replaced with replacement mouth regions generated based on the set of time-synchronized viseme parameters;

wherein the initial video data object V is utilized to populate a viseme library of available visemes based on the initial set of expression/viseme codes; and wherein the method further comprises comparing visemes identified in the target audio data object A' to the viseme library of available visemes based on the initial set of expression/viseme codes to identify a subset of visemes not in the viseme library and requiring synthesis.

* * * * *